United States Patent [19]

Kühlthau

[11] 4,039,526
[45] Aug. 2, 1977

[54] CATIONIC DYESTUFFS CONTAINING QUATERNIZED BENZTHIAZOLE AND P-SUBSTITUTED AMINO AZO PHENYL MOIETIES

[75] Inventor: Hans-Peter Kühlthau, Leverkusen, Germany

[73] Assignee: Bayer Aktiengesellschaft, Leverkusen, Germany

[21] Appl. No.: 606,584

[22] Filed: Aug. 21, 1975

[30] Foreign Application Priority Data

Aug. 21, 1974 Germany .............................. 2440021

[51] Int. Cl.$^2$ ...................... C09B 43/00; C09B 27/00
[52] U.S. Cl. .................................. 260/158; 260/146 R
[58] Field of Search ............................ 260/158, 146 R

[56] References Cited
FOREIGN PATENT DOCUMENTS

| 556,218 | 4/1958 | Canada | 260/158 |
| 1,540,834 | 9/1968 | France | 260/158 |
| 1,179,399 | 1/1970 | United Kingdom | 260/158 |
| 1,351,375 | 4/1974 | United Kingdom | 260/158 |
| 1,324,235 | 7/1973 | United Kingdom | 260/158 |
| 976,239 | 11/1964 | United Kingdom | 260/158 |

Primary Examiner—Charles F. Warren
Attorney, Agent, or Firm—Plumley and Tyner

[57] ABSTRACT

Dyestuffs of the formula

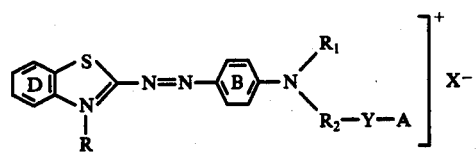

wherein
R represents alkyl, alkenyl, cycloalkyl or aralkyl,
$R_1$ represents hydrogen, alkyl, alkenyl, cycloalkyl or aralkyl
$R_2$ represents alkylene, of which the chain can be interrupted by O,
Y represents -CO- or -O-CO-O-,
A represents an aromatic ring and
$X^-$ represents an anion, are suitable for dyeing and printing of polyacrylonitrile and acid modified polyesters and polyamides.

13 Claims, No Drawings

CATIONIC DYESTUFFS CONTAINING QUATERNIZED BENZTHIAZOLE AND P-SUBSTITUTED AMINO AZO PHENYL MOIETIES

The invention relates to new cationic dyestuffs of the general formula

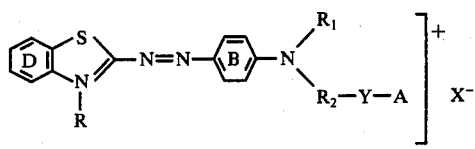

(I)

wherein
R represents an alkyl, alkenyl, cycloalkyl or aralkyl radical,
$R_1$ represents hydrogen, an alkyl, alkenyl, cycloalkyl or aralkyl radical,
$R_2$ represents an alkylene group of which the chain can be interrupted by O,
Y represents a —CO— or a —O—CO—O— group,
A represents an aromatic ring and
$X^-$ represents an anion
and wherein
the cyclic and acyclic radicals can contain non-ionic substituents,
and wherein
the rings A, B and D can be fused with other, optionally non-ionically substituted, carbocyclic or heterocyclic rings, as well as mixtures of such dyestuffs, processes for the preparation of these dyestuffs, their use for dyeing, printing and bulk dyeing of natural and synthetic materials, and the materials dyed and printed with these dyestuffs.

The following may be mentioned as examples of the radicals mentioned in the definitions of R and $R_1$:

As alkyl radicals, above all $C_1$-$C_6$-alkyl radicals, such as the methyl, ethyl, n- and i-propyl, n-, sec.- and t-butyl radical and the n- and i-amyl and n-hexyl radical, as well as $C_1$-$C_6$-alkyl radicals substituted by the carboxyl group or by non-ionic substituents, such as halogen atoms, hydroxyl, $C_1$-$C_4$-alkoxy, cyano, $C_1$-$C_4$-alkoxycarbonyl, $C_1$-$C_4$-alkylcarbonyloxy, carboxylic acid amide, $C_1$-$C_6$-alkylsulphonyl-amino, N-($C_1$-$C_6$-alkyl)-N-($C_1$-$C_6$-alkylsulphonyl)-amino or N-($C_1$-$C_6$-alkyl)-N-(phenylsulphonyl)-amino groups, such as the trifluoromethyl, chloroethyl, bromoethyl, hydroxyethyl, methoxyethyl, cyanoethyl, acetoxyethyl, aminocarbonylethyl, carboxyethyl, γ-cyanopropyl, β-hydroxy-n-propyl, β-hydroxy-n-butyl, β-hydroxy-i-butyl, β-hydroxy-γ-allyloxy-n-propyl, γ-methoxycarbonyl-n-butyl, phenylsulphonylaminoethyl, $C_1$-$C_6$-alkylsulphonylaminoethyl, N-(phenylsulphonyl)-N-methylaminoethyl or N-methylsulphonyl-N-methyl radical.

As alkenyl radicals, above all $C_2$-$C_6$-alkenyl radicals, such as the vinyl, allyl or methallyl radical, and their derivatives substituted by non-ionic radicals, such as halogen, such as the 2-chloroalkyl radical.

As cycloalkyl radicals, above all the cyclopentyl and cyclohexyl radical and their derivatives substituted by non-ionic substituents, such as halogen atoms or $C_1$-$C_6$-alkyl groups, such as the 4-chlorocyclohexyl and th dimethylcyclohexyl radical.

As aralkyl radicals, above all the benzyl, 2-phenylethyl, β-phenyl-β-hydroxyethyl or 2-phenylpropyl-(2) radical and their derivatives substituted in the phenyl nucleus by non-ionic groups or atoms, such as halogen or $C_1$-$C_6$-alkyl, such as the 4-chlorobenzyl and 3-methylbenzyl radical.

As examples of $R_2$ there may be mentioned unbranched or branched $C_1$-$C_6$-alkylene radicals, of which the chain can be interrupted by ether oxygen, and which can be substituted, such as phenoxymethylethylene, $C_1$-$C_4$-alkoxymethylethylene or phenylethylene.

A preferably represents a phenyl or naphthyl radical and their derivatives, which carry 1-3 substituents.

Examples of preferred substituents of the ring A are $C_1$-$C_{12}$-alkyl, $C_1$-$C_6$-alkoxy, halogen, $C_1$-$C_4$-alkoxycarbonyl, phenyl, benzyl, 2-phenylethyl, 2-phenylpropyl, cyclohexyl, $C_1$-$C_4$-alkylsulphonyl or phenylsulphonyl.

A benzene or tetrahydrobenzene ring, for example, can be fused to the ring B, and a benzene or tetrahydrobenzene ring, for example, can be fused to the ring D in the 4,5-, 5,6- or 6,7-position. These rings can carry 1-3 substituents.

Examples of preferred substituents of the ring B are halogen, $C_1$-$C_6$-alkyl, trifluoromethyl, $C_1$-$C_4$-alkoxy, phenoxy, benzyloxy, benzyl, cyano, $C_1$-$C_3$-alkylcarbonylamino, benzoylamino, $C_1$-$C_3$-sulphonylamino, phenylsulphonylamino, $C_1$-$C_3$-alkylcarbonyloxy, benzoyloxy or $C_1$-$C_4$-alkylsulphonyl.

Examples of preferred substituents of the ring D are $C_1$-$C_6$-alkyl and $C_1$-$C_4$-alkoxy; cyclopentyl, cyclohexyl, benzyl or β-phenylethyl which are optionally substituted by $C_1$-$C_6$-alkyl; phenoxy or naphthyloxy which are optionally substituted by $C_1$-$C_6$-alkyl or halogen; benzyloxy; $C_1$-$C_4$-alkylcarbonylamino or $C_1$-$C_4$-alkylsulphonylamino, phenylcarbonylamino or phenylsulphonylamino.

Halogen is preferably understood as fluoride, chlorine or bromine.

By non-ionic substituents in the sense of the present invention there are . . . the substituents which are customary in dyestuff chemistry and do not dissociate under the reaction conditions in question, such as halogen, for example fluorine, chlorine and bromine; nitro, cyano, formyl, ureido, aminocarbonyl and aminosulphonyl; the following radicals, containing alkyl groups in which the alkyl groups mentioned preferably possess 1-4 C atoms: alkoxy, alkylthio, alkoxycarbonyl, alkylcarbonyl, alkylcarbonyloxy, alkoxycarbonyloxy, alkylcarbonylamino, alkylaminocarbonyloxy, alkylsulphonylamino, alkylureido, alkoxycarbonylamino, alkylaminocarbonyl, dialkylaminocarbonyl, N-alkyl-N-aryl-aminocarbonyl, wherein the aryl group preferabyl represents a phenyl group, alkylaminosulphonyl, dialkylaminosulphonyl, alkylsulphonyl, alkoxysulphonyl or alkylsulphonyl-alkylamino; furthermore, aryl and radicals containing aryl groups, in which the aryl radical preferably denotes phenyl or naphthyl: aryloxy, aryloxyalkoxy, arylthio, arylcarbonyl, aryloxycarbonyloxy, arylcarbonyloxy, arylcarbonylamino, arylaminocarbonyloxy, arylsulphonylamino, arylsulphonylalkylamino, arylureido, aryloxycarbonylamino, arylsulphonyl, aryloxycarbonyl or aryloxysulphonyl; radicals containing aralkyl groups, in which the aralkyl groups preferably denote benzyl or phenylethyl: aralkoxy, aralkylthio, aralkylcarbonyl, aralkylsulphonyl or aralkyloxycarbonyl; as well as cycloalkyl or radicals containing cycloalkyl groups, in which the cycloalkyl group preferably represents a cyclopentyl or cyclohexyl radical, such as cycloalkoxy.

Further possible non-ionic substituents which are bonded to a cyclic radical are alkyl with, preferably 1-12 C atoms, or aralkyl having the abovementioned preferred definition.

Possible anionic radicals X⁻ are the organic and inorganic anions which are customary for cationic dyestuffs.

Examples of inorganic anions are fluoride, chloride, bromide and iodide, perchlorate, hydroxyl, radicals of acids containing S, such as bisulphate, sulphate, disulphate and aminosulphate; radicals of nitrogen-oxygen acids, such nitrate; radicals of oxygen acids of phosphorus, such as dihydrogen phosphate, hydrogen phosphate, phosphate and metaphosphate; radicals of carbonic acid, such as bicarbonate and carbonate; further anions of oxygen acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerol ester of boric acid, and of esters of phosphoric acid, such as of methylphosphate.

Examples of organic anions are anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethylsulphonic acid, methylaminoethylsulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, 0-ethylglycollic acid, thioglycollic acid, glyceric acid, malic acid, dodecyl-tetraethylene glycolether-propionic acid, 3-(nonyloxy)-propionic acid, 3-(isotridecyloxy)-propionic acid, 3-(isotridecyloxy)-diethylene glycolether-propionic acid, the ether-propionic acid of the alcohol mixture with 6 to 10 carbon atoms, thioacetic acid, 6-benzoylamino-2-chlorocaproic acid, nonylphenol-tetraethylene glycolether-propionic acid, nonylphenol-diethylene glycol-ether-propionic acid, dodecyl-tetraethylene glycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 from SHELL), a mixture of aliphatic carboxylic acids with 15 to 19 carbon atoms (Versatic Acid 1519 from SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,4,4-trimethyladipic acid, sebacic acid, isosebacic acid (isomer mixture), tartaric acid, citric acid, glyoxylic acid, dimethyl ether-$\alpha,\alpha'$-dicarboxylic acid, methylene-bis-thioglycollic acid, dimethyl sulphide-$\alpha,\alpha'$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid and Mersolat, that is to say $C_8$-$C_{15}$ paraffinsulphonic acids, obtained by hydrolysis of the sulphochlorination products of the corresponding n-paraffins.

Examples of suitable anions of cycloaliphatic carboxylic acids are the anions of cyclohexanecarboxylic acid and cyclohexane-3-carboxylic acid and examples of anions of araliphatic monocarboxylic acids are anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitro-isophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-caroxylic acid, 2-hydroxyl-1-naphthoic acid and anthraquinone-2-carboxylic acid.

Examples of suitable anions of heterocyclic carboxylic acids are the anions of pyromucic acid, dehydromucic acid and indolyl-3-acetic acid.

Examples of suitable anions of aromatic sulphonic acids are the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-$\omega$-sulphonic acid, 2-chlorotoluene-4-sulphonic acid, 2-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4- or -1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

An example of a suitable anion of heterocyclic sulphonic acids is the anion of quinoline-5-sulphonic acid.

Further anions which can be used are those of arylsulphinic, arylphosphonic and arylphosphonous acids, such as benzenesulphinic acid and benzenephosphonic acid.

Colourless anions are preferred. For dyeing from an aqueous medium, anions which do not excessively impair the solubility of the dyestuff in water are preferred. For dyeing from organic solvents, anions which assist the solubility of the dyestuff in organic solvents or at least do not influence it adversely are preferred.

The anion is in general decided by the process of preparation and by the purification of the crude dyestuff which may have been carried out. In general the dyestuffs are in the form of halides (especially chlorides or bromides) or methosulphates, ethosulphates, sulphates, benzenesulphonates or toluenesulphonates, or acetates. The anions can be replaced by other anions in a known manner.

Preferred dyestuffs correspond to the general formula

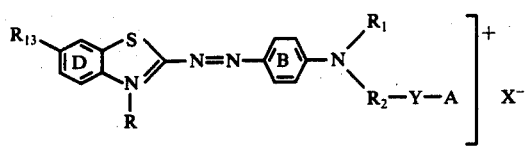

(II)

in which
R, $R_1$, $R_2$, Y, A and $X^-$ have the meaning indicated for formula (I) and
$R_{13}$ represents hydrogen, alkyl, cycloalkyl, aralkyl, alkoxy, aryloxy, aralkoxy, acylamino or halogen,
and wherein
the cyclic and acyclic radicals can contain non-ionic substituents and
the rings A, B and D can be fused with other, optionally non-ionically substituted, carbocyclic or heterocyclic rings.

Dyestuffs of particular importance are those of the general formula

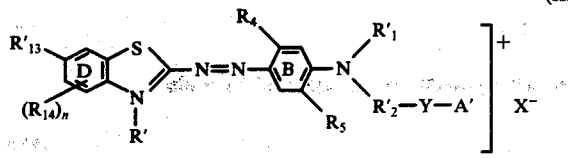

(III)

wherein
$X^-$ and Y have the meaning indicated for formula I and R′ represents $C_1$-$C_6$-alkyl, $C_2$-$C_7$-alkenyl, benzyl or phenylethyl optionally substituted by halogen, hydroxyl, cyano, $C_1$-$C_3$-alkylcarbonyloxy, $C_1$-$C_4$-alkoxycarbonyl, hydroxycarbonyl or aminocarbonyl, or the radical

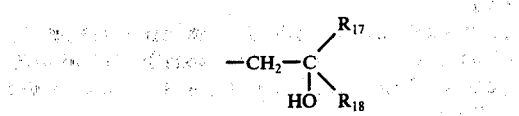

wherein
$R_{17}$ denotes hydrogen or methyl and
$R_{18}$ denotes methyl, ethyl, chloromethyl, $C_1$-$C_4$-alkoxymethyl, allyloxymethyl, phenoxymethyl or phenyl,
$R′_1$ represents $C_1$-$C_6$-alkyl optionally substituted by halogen, hydroxyl, $C_1$-$C_4$-alkoxy, cyano, $C_1$-$C_3$- alkylcarbonyloxy, hydroxycarbonyl, $C_1$-$C_4$-alkoxycarbonyl,
$C_1$-$C_4$-alkoxycarbonyloxy, aminocarbonyl, $C_1$-$C_4$-alkylsulphonylamino or $C_1$-$C_4$-alkylsulphonyl-$C_1$-$C_4$-alkylamino; $C_2$-$C_7$-alkenyl; or cyclopentyl, cyclohexyl, benzyl or β-phenylethyl which are optionally substituted by $C_1$-$C_6$-alkyl.

$R′_2$ represents

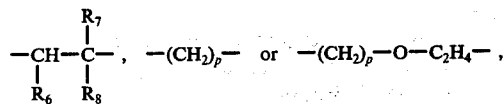

wherein
$R_6$ -denotes hydrogen, methyl, ehtyl, $C_1$-$C_4$-alkoxymethyl, allyloxymethyl, phenyl or phenoxymethyl,
$R_7$ denotes hydrogen, methyl, ethyl, $C_1$-$C_4$-alkoxymethyl, allyloxymethyl, phenyl, phenoxymethyl or -Y-A,
$R_8$ denotes hydrogen or methy and
p denotes the numbers from 1 to 6,
$R_4$ represents hydrogen, halogen, $C_1$-$C_6$-alkyl which is optionally substituted by halogen, $C_1$-$C_4$-alkoxy, benzyloxy or β-phenylethyloxy which are optionally substituted by $C_1$-$C_6$-alkyl in the phenyl ring, cyano, phenoxy or naphthyloxy which are optionally substituted by $C_1$-$C_6$-alkyl or halogen, $C_1$-$C_4$-alkylcarbonylamino or $C_1$-$C_4$-alkylsulphonylamino, phenylcarbonylamino or phenylsulphonylamino, $C_1$-$C_4$-alkylcarbonyloxy or phenylcarbonyloxy or, together with B, a naphthalene or 1,2,3,4-tetrahydronaphthalene ring,
$R_5$ represents hydrogen, $C_1$-$C_6$-alkyl, $C_1$-$C_4$-alkoxy, benzyloxy or β-phenylethyloxy which are optionally substituted by $C_1$-$C_6$-alkyl in the phenyl ring, phenoxy or naphthyloxy which are optionally substituted by $C_1$-$C_6$-alkyl or halogen, $C_1$-$C_4$-alkylcarbonylamino or -sulphonylamino, phenylcarbonylamino or -sulphonylamino, $C_1$-$C_4$-alkylcarbonyloxy or phenylcarbonyloxy or, together with B, a naphthalene or tetralin ring,
$R′_{13}$ represents hydrogen, $C_1$-$C_6$-alkyl; $C_1$-$C_4$-alkoxy; cyclopentyl, cyclohexyl, benzyl or β-phenylethyl which are optionally substituted by $C_1$-$C_6$-alkyl; phenoxy or naphthyloxy which are optionally substituted by $C_1$-$C_6$-alkyl or halogen; benzyloxy; $C_1$-$C_4$-alkylcarbonylamino or -sulphonylamino, phenylcarbonylamino or -sulphonylamino; or a benzene or tetrahydrobenzene ring fused to the 4,5- or 5,6-position of D;
$R_{14}$ represents $C_1$-$C_6$-alkyl, $C_1$-$C_4$-alkoxy, phenoxy, benzyloxy, benzyl, trifluoromethyl, halogen, $C_1$-$C_4$-alkylcarbonylamino or $C_1$-$C_4$-alkylsulphonylamino, phenylcarbonylamino or phenylsulphonylamino, or a benzene or tetrahydrobenzene ring fused to the 6,7-position of D,
n represents the numbers 0, 1, 2 or 3 and
A′ represents a radical of the benzene, naphthalene or tetrahydronaphthalene series which can be substituted by $C_1$-$C_4$-alkyl, $C_1$-$C_4$-alkoxy, halogen, phenyl, cyclohexyl, $C_1$-$C_4$-alkoxycarbonyl, benzyl, $C_1$-$C_4$-alkylsulphonyl or phenylsulphonyl, whilst the cyclic radicals mentioned can in turn be substituted by halogen, $C_1$-$C_4$-alkyl or $C_1$-$C_4$-alkoxy.

Amongst the formula III, there should be singled out those dyestuffs
in which
R'$_{13}$ represents an alkoxy group with 1-4 C atoms and
R$_{14}$ represents methyl, ethyl, methoxy, ethoxy, chlorine, bromine, fluorine, trifluormethyl, phenoxym or benzyloxy.

Of these examples, those of the greatest interest are dyestuffs
in which
R'$_{13}$ represents a methoxy or ethoxy group,
R' represents methyl or ethyl,
R$_5$ represents hydrogen,
R$_4$ represents hydrogen, methoxy, chlorine or methyl,
p represents the number 2 and
n represents the number 0.

Further dyestuffs of particular importance are those of the general formula

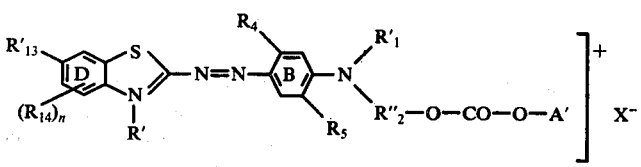

wherein
R', R'$_1$, R$_4$, R$_5$, R'$_{13}$, R$_{14}$, A', n and X$^-$ have the same meaning as in the formula III
and wherein
R''$_2$ represents

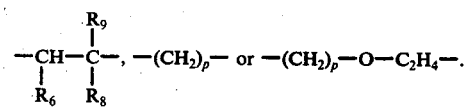

In these formulae
R$_6$, R$_8$ and p have the same meaning as in formula III and
R$_9$ represents hydrogen, methyl, ethyl, methoxymethyl, ethoxymethyl, propoxymethyl, butoxymethyl, allyloxymethyl, phenyl, phenoxymethyl or -O-CO-O-A'.

Amongst formula IV, dyestuffs to be singled out are those
in which
R'$_{13}$ represents an alkoxy group with 1-4 C atoms and
R$_{14}$ represents methyl, ethyl, methoxy, ethoxy, chlorine, bromine, fluorine, trifluoromethyl, phenoxy or benzyloxy.

Of these examples, those of the greatest interest are dyestuffs
in which
R'$_{13}$ represents a methoxy or ethoxy group,
R' represents methyl or ethyl,
R$_5$ represents hydrogen,
R$_4$ represents hydrogen, methoxy, chlorine or methyl,
n represents the number 0 and
p represents the number 2.

Further dyestuffs of particular interest are those of the general formula (V)

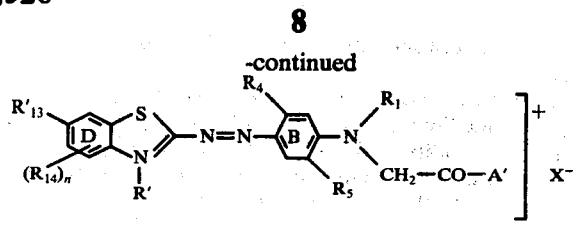

wherein
R', R$_1$, R$_4$, R$_5$, R'$_{13}$, R$_{14}$, A', n and X$^-$ have the same meaning as in formula III.

Amongst formula V, dyestuffs to be singled out are those
in which
R'$_{13}$ represents an alkoxy group with 1-4 C atoms and
R$_{14}$ represents methyl, ethyl, methoxy, ethoxy, chlorine, bromine, fluorine, trifluoromethyl, phenoxy or benzyloxy.

Amongst these examples, those of the greatest interest are dyestuffs
in which
R'$_{13}$ represents a methoxy or ethoxy group,
R' represents methyl or ethyl,
R$_5$ represents hydrogen,
R$_4$ represents hydrogen, methoxy, chlorine or methyl and
n represents the number 0.

Dyestuffs of the formula I are prepared in a manner which is in itself known by the action of quaternising agents of the general formula

R - X       (VI)

on azo dyestuffs of the general formula (VII)

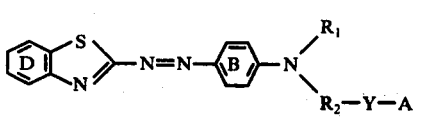

In these formulae
X denotes a radical which can be split off as an anion and
R$_1$, R$_2$, Y and A have the meaning indicated for formula I.

The cyclic and acyclic radicals can carry non-ionic substituents and optionally non-ionically substituted carbocyclic or heterocyclic rings can be fused to the rings A, B and D.

Examples of suitable quaternising compounds are alkyl halides, alkenyl halides, aralkyl halides, cycloalkyl halides, dialkyl sulphates, alkyl esters of arylsulphonic acids and other esters of strong mineral acids and organic sulphonic acids with preferably lower alcohols.

The quaternising agents can be substituted further as in the example of bromopropionic acid amide and bromopropionitrile.

The treatment with these compounds can be carried out without or with addition of a further solvent or in aqueous suspension at temperatures of 5°-100° C, preferably 15°-90° C. The presence of a basic material such as magnesium oxide, alkali metal carbonate, alkaline earth metal carbonate, potassium acetate, sodium bicarbonate or mixtures of such basic materials may be indicated.

Examples of suitable solvents are halogenobenzenes, benzenehydrocarbons, dialkyl ketones, halogenoalkanes (such as carbon tetrachloride, tetrachloroethylene and chloroform), nitrobenzene, dimethylformamide, acetonitrile, glacial acetic acid, formic acid or alcohols.

The alkylation of azo dyestuffs of the formula VII to give basic dyestuffs of the formula I can also be carried out by treatment with acrylic acid or its derivatives, for example acrylamide, in the presence of an organic or inorganic acid, such as acetic acid, formic acid, hydrochloric acid or their mixtures, at temperatures between 50° and 100° C.

The quaternisation can also be carried out by treatment with ethylene oxide or an epoxy compound of the formula

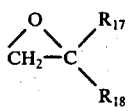

VIII wherein $R_{17}$ and $R_{18}$ have the meaning indicated for formula III.

This reaction is carried out using a solvent, in the presence of an organic or inorganic acid which yields the anion $X^-$, at temperatures of 10°-100° C, preferably at 40°-90° C.

Examples of suitable acids are sulphuric acid, phosphoric acid, hydrochloric acid, hydrobromic acid, benzenesulphonic acid, toluenesulphonic acid, formic acid, acetic acid or propionic acid, and the liquid fatty acids can at the same time be used as solvents. Further suitable solvents are, for example, dimethylformamide, acetonitrile, dioxane, tetrahydrofurane, halogenobenzene, benzenehydrocarbons, nitrobenzene, dialkyl ketones and the like.

The compounds of the formula VII, some of which are known, are obtained when 2-aminobenzthiazoles of the formula

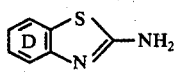

IX wherein
the ring D can carry non-ionic substitutents and/or can be fused to one or more further rings are diazotised and then coupled to anilines of the formula

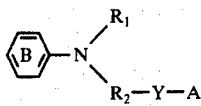

(X)

wherein $R_1$, $R_2$, Y and A have the meaning indicated for formula I. The cyclic and acyclic radicals can carry non-ionic substituents and further rings can be fused to the rings A and B.

Dyestuffs of the formula I can furthermore be prepared by oxidative coupling of hydrazones of the formula

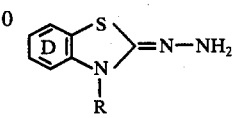

(XI)

wherein

R has the meaning indicated for formula I and the ring D and R can carry non-ionic substituents and the ring D can be fused to further rings, with anilines of the formula X.

Examples of suitable benzthiazoles of the formula IX are: 2-amino-6-methoxy-benzthiazole, 2-amino-6-ethoxy-benzthiazole, 2-amino-6-methoxy-4-methyl-benzthiazole, 2-amino-5,6-dimethoxy-benzthiazole, 2-amino-4,6-dimethoxy-benzthiazole, 2-amino-5-methyl-6-methoxy-benzthiazole, 2-amino-6-(α-ethylcapronylamino)-benzthiazole, 2-amino-benzthiazole, 2-amino-6-benzoylamino-benzthiazole, 2-amino-6acetylamino-benzthiazole, 2-amino-6-butoxy-benzthiazole, 2-amino-6-propoxy-benzthiazole and 2-amino-6-methyl-benzthiazole.

Examples of suitable coupling components of the formula X are: N-β-phenoxy-carbonyloxy-ethyl-N-ethylaniline, N-β-(β'-phenoxy-carbonyloxy-ethyloxy)-ethyl-N-ethylaniline, N-γ-(phenoxy-carbonyloxy)-propyl-N-ethylaniline, N-β-(p-chlorophenoxy-carbonyloxy)-ethyl-N-ethylaniline, N-β-(o-chlorophenoxy-carbonyloxy)-ethyl-N-ethylaniline, N-β-(p-methylphenoxy-carbonyloxy)-ethyl-N-ethylaniline, N-β-(o-methylphenoxy-carbonyloxy)-ethyl-N-ethylaniline, N-β-(p-ethylphenoxy-carbonyloxy)-ethyl-N-ethylaniline, N-β-(o-ethylphenoxycarbonyloxy)-ethyl-N-ethylaniline, N-β-(m-methylphenoxycarbonyloxy)-ethyl-N-ethylaniline, N-β-(p-cyclohexylphenoxycarbonyloxy)-ethyl-N-ethylaniline, N-β-(β'-naphthoxycarbonyloxy)-ethyl-N-ethylaniline, N-β-(o-isopropyloxyphenoxycarbonyloxy)-ethyl-N-ethylaniline, N-β-(o,p-dichlorophenoxycarbonyloxy)-ethyl-N-ethylaniline, N-β-(p-phenylphenoxycarbonyloxy)-ethyl-N-ethylaniline, N-β-(p-benzylphenoxycarbonyloxy)-ethyl-N-ethylaniline, N-β-(o-benzylphenoxycarbonyloxy)-ethyl-N-ethylaniline, N-β-(p-tert.-butylphenoxycarbonyloxy)-ethyl-N-ethylaniline, N-β-(p-methoxyphenoxycarbonyloxy)-ethyl-N-ethylaniline, N-β-(o-isopropylphenoxycarbonyloxy)-ethyl-N-ethylaniline, N-δ-(phenoxy-carbonyloxy)-butyl-N-ethylaniline, N-β-(3,5-dimethylphenoxy-carbonyloxy)-ethyl-N-ethylaniline, N-β-(3,5-dimethyl-4-chlorophenoxycarbonyloxy)-ethyl-N-ethylaniline, N-β-[p-(2-phenylisopropyl)-phenoxy-carbonyloxy]-ethyl-N-ethylaniline, N-β-(m-chlorophenoxy-carbonyloxy)-ethyl-N-ethylaniline, N-β-(2,5-dichlorophenoxy-carbonyloxy)-ethyl-N-ethylaniline, N-β-(2,4,5-trichlorophenoxy-carbonyloxy)-ethyl-N-ethylaniline, N-β-(2,4,6-trichlorophenoxy-carbonyloxy)-ethyl-N-ethylaniline, N-β-(2,6-dichlorophenoxy-carbonyloxy)-ethyl-N-ethylaniline, N-β-(pentachlorophenoxy-carbonyloxy)-ethyl-N-ethylaniline, N-β-(2-chloro-6-methylphenoxy-carbonyloxy)-ethyl-N- ethylaniline, N-β-(2-methyl-5-chlorophenoxy-carbonyloxy)-ethyl-N-ethylaniline, N-β-(2-methyl-4-chlorophenoxy-carbonyloxy-ethyl-N-ethylaniline N-β-(2-methyl-3-chlorophenoxy-carbonyloxy)-ethyl-N-ethylaniline, N-β-(2-chloro-5-methylphenoxy-carbonyloxy)-ethyl-N-ethylaniline, N-β-(3-methyl-4-chlorophenoxycarbonyloxy)-ethyl-N-ethylaniline, N-β-(2,4,6-trichloro-3-methylphenoxy-carbonyloxy)-ethyl-N-ethylaniline, N-β-(2,3-dimethylphenoxy-carbonyloxy)-ethyl-N-ethylaniline, N-β-(3,4-dimethylphenoxy-carbonyloxy)-ethyl-N-ethylaniline, N-β-(2,6-dimethylphenoxy-carbonyloxy)-ethyl-N-ethylaniline, N-β-(2,4-dimethylphenoxy-carbonyloxy)-ethyl-N-ethylaniline, N-β-(2,5-dimethylphenoxy-carbonyloxy)-ethyl-N-ethylaniline, N-β-(3-methyl-5-ethylphenoxy-carbonyloxy)-ethyl-N-ethylaniline, N-β-(2,3,5-trimethylphenoxy-carbonyloxy)-ethyl-N-ethylaniline, N-β-(o-sec.-butylphenoxy-carbonyloxy)-ethyl-N-ethylaniline, N-β-(2-isopropyl-5-methylphenoxy-carbonyloxy)-ethyl-N-ethylaniline, N-β-(3-methyl-5-isopropyl-phenoxy-carbonyloxy)-ethyl-N-ethylaniline, N-β-[p-(1,1,3,3-tetramethylbutyl)-phenoxycarbonyloxy]-ethyl-N-ethylaniline, N-β-(nonylphenoxycarbonyloxy)-ethyl-N-ethylaniline, N-β-(dodecylphenoxycarbonyloxy)-ethyl-N-ethylaniline, N-β-(2,6-diisopropylphenoxy-carbonyloxy)-ethyl-N-ethylaniline, N-β-(2-cyclohexylphenoxy-carbonyloxy)-ethyl-N-ethylaniline, N-β-(α'-naphthoxycarbonyloxy)-ethyl-N-ethylaniline, N-β-(o-phenylphenoxycarbonyloxy)-ethyl-N-ethylaniline, N-β-(m-phenylphenoxycarbonyloxy)-ethyl-N-ethylaniline, N-β-(o-ethoxy-phenoxycarbonyloxy)-ethyl-N-ethylaniline, N-β-(m-methoxyphenoxycarbonyloxy)-ethyl-N-ethylaniline, N-β-(p-phenylsulphonylphenoxycarbonyloxy)-ethyl-N-ethylaniline, N-β-(p-methoxycarbonylphenoxy-carbonyloxy)-ethyl-N-ethylaniline, N-β-phenoxy-carbonyloxy-n-butyl-N-ethylaniline, N-(1-phenoxycarbonyloxy)-sec.-butyl-N-ethylaniline, N-1-phenoxycarbonyloxy-i-propyl-N-ethylaniline, N,N-bis-(β-phenoxycarbonyloxyethyl)-aniline, N-cyclohexyl-N-β-phenoxycarbonyloxyethylaniline, N-benzyl-N-β-phenoxycarbonyloxyethyl-aniline, N-n-propyl-N-β-phenoxycarbonyloxyethyl-aniline, N-β-chloroethyl-N-β-phenoxycarbonyloxyethyl-aniline, N-β-bromoethyl-N-β-phenoxycarbonyloxyethyl-aniline, N-β-cyanoethyl-N-β-phenoxycarbonyloxyethyl-aniline, N-β-acetoxyethyl-N-β-phenoxycarbonyloxyethyl-aniline, N-β-methoxyethyl-N-β-phenoxycarbonyloxyethylaniline, N-β-butoxyethyl-N-β-phenoxycarbonyloxyethyl-aniline, N-β-hydroxy-n-butyl-N-β-phenoxycarbonyloxyethyl-aniline, N-β-hydroxy-n-propyl-N-β-phenoxycarbonyloxyethyl-aniline, N-cyanomethyl-N-β-phenoxycarbonyloxyethyl-aniline, N-β-carbonamidoethyl-N-β-phenoxycarbonyloxyethyl-aniline, N-benzoylmethyl-N-ethylaniline, N-4-chlorobenzoyl-methyl-N-ethylaniline, N-2-chlorobenzoyl-methyl-N-ethylaniline, N-2,4-dichlorobenzoylmethyl-N-ethylaniline, N-2,5dichlorobenzoyl-methyl-N-ethylaniline, N-4-bromobenzoyl-methyl-N-ethylaniline, N-4-methylbenzoyl-methyl-N-ethylaniline, N-2,4-dimethylbenzoyl-methyl-N-ethylaniline, N-2,5-dimethylbenzoyl-methyl-N-ethylaniline, N-2,4,5-trimethylbenzoyl-methyl-N-ethylaniline, N-4-ethylbenzoyl-methyl-N-ethylaniline, N-3,4-dimethylbenzoyl-methyl-N-ethylaniline, N-2,3,4,5-tetramethylbenzoyl-methyl-N-ethylaniline, N-naphthoyl-methyl-N-ethylaniline, N-cyclohexyl-N-benzoylmethyl-N-ethylaniline, N-benzyl-N-benzoylmethyl-N-ethylaniline, N-n-propyl-N-benzoylmethyl-N-ethylaniline, N-β-chloroethyl-N-benzoylmethyl-N-ethylaniline, N-β-cyanoethyl-N-benzoylmethyl-N-ethylaniline, N-β-acetoxyethyl-N-benzoylmethyl-N-ethylaniline, N-β-methoxyethyl-N-benzoylmethyl-N-ethylaniline, N-β-ethoxyethyl-N-benzoylmethyl-N-ethylaniline, N-β-butoxyethyl-N-benzoylmethyl-N-ethylaniline, N-cyanomethyl-N-benzoylmethyl-N-ethylaniline, N-β-carbonamidoethyl-N-benzoylmethyl-N-ethylaniline, N-β-phenoxy-carbonyloxy-ethyl-N-methylaniline, N-β-(β'-phenoxy-carbonyloxy-ethyloxy)-ethyl-N-methylaniline, N-γ-(phenoxy-carbonyloxy)-propyl-N-methylaniline, N-β-(p-chlorophenoxy-carbonyloxy)-ethyl-N-methylaniline, N-β-(o-chlorophenoxy-carbonyloxy)-ethyl-N-methylaniline, N-β-(p-methylphenoxy-carbonyloxy)-ethyl-N-methylaniline, N-β-(o-methylphenoxy-carbonyloxy)-ethyl-N-methylaniline, N-β-(p-ethylphenoxy-carbonyloxy)-ethyl-N-methylaniline, N-β-(o-ethylphenoxy-carbonyloxy)-ethyl-N-methylaniline, N-β-(m-methylphenoxy-carbonyloxy)-ethyl-N-methylaniline, N-β-(p-cyclohexylphenoxy-carbonyloxy)-ethyl-N-methylaniline, N-β-(β'-naphthoxycarbonyloxy)-ethyl-N-methylaniline, N-β-(o-isopropyloxyphenoxycarbonyloxy)-ethyl-N-methylaniline, N-β-(o,p-dichlorophenoxycarbonyloxy)-ethyl-N-methylaniline, N-β-(p-phenylphenoxycarbonyloxy)-ethyl-N-methylaniline, N-β-(p-benzylphenoxycarbonyloxy)-ethyl-N-methylaniline, N-β-(o-benzylphenoxycarbonyloxy)-ethyl-N-methylaniline, N-β-(p-tert.-butylphenoxycarbonyloxy)-ethyl-N-methylaniline, N-β-(p-methoxyphenoxycarbonyloxy)-ethyl-N-methylaniline, N-β-(o-isopropylphenoxycarbonyloxy)-ethyl-N-methylaniline, N-δ-(phenoxy-carbonyloxy)-butyl-N-methylaniline, N-β-(3,5-dimethylphenoxy-carbonyloxy)-ethyl-N-methylaniline, N-β-(3,5-dimethyl-4-chlorophenoxycarbonyloxy)-ethyl-N-methylaniline, N-β-[p-(2-phenylisopropyl)-phenoxy-carbonyloxy]-ethyl-N-methylaniline, N-β-(m-chlorophenoxy-carbonyloxy)-ethyl-N-methylaniline, N-β-(2,5-dichlorophenoxy-carbonyloxy)-ethyl-N-methylaniline, N-β-(2,4,5-trichlorophenoxy-carbonyloxy)-ethyl-N-methylaniline, N-β-(phenoxy-carbonyloxy-ethyl-N-butylaniline, N-β-(β'-phenoxycarbonyloxy-ethyloxy)-ethyl-N-butylaniline, N-γ-(phenoxycarbonyloxy)-propyl-N-butylaniline, N-β-(p-chlorophenoxycarbonyloxy)-ethyl-N-butylaniline, N-β-(o-chlorophenoxycarbonyloxy)-ethyl-N-butylaniline, N-β-(p-methylphenoxycarbonyloxy)-ethyl-N-butylaniline, N-β-(o-methylphenoxycarbonyloxy)-ethyl-N-butylaniline, N-β-(p-ethylphenoxycarbonyloxy)-ethyl-N-butylaniline, N-β-(o-ethylphenoxycarbonyloxy)-ethyl-N-butylaniline, N-β-(m-methylphenoxycarbonyloxy)-ethyl-N-butylaniline, N-β-(p-cyclohexylphenoxy)-ethyl-N-butylaniline, N-β-(β'-naphthoxycarbonyloxy)-ethyl-N-butylaniline, N-β-(o-isopropyloxyphenoxycarbonyloxy)-ethyl-N-butylaniline, N-β-(o,p-dichlorophenoxycarbonyloxy)-ethyl-N-butylaniline, N-β-(p-phenylphenoxycarbonyloxy)-ethyl-N-butylaniline, N-β-(p-benzylphenoxycarbonyloxy)-ethyl-N-butylaniline, N-β-(o-benzylphenoxycarbonyloxy)-ethyl-N-butylaniline, N-β-(p-tert.-butylphenoxycarbonyloxy)-ethyl-N-butylaniline, N-β-(p-methoxyphenoxycarbonyloxy)-ethyl-N-butylaniline, N-β-(o-isopropylphenoxycarbonyloxy)-ethyl-N-butylaniline, N-δ-(phenoxy-carbonyloxy)-butyl-N-butylaniline, N-β-(3,5-dimethylphenoxy-carbonyloxy)-ethyl-N-butylaniline, N-β-(3,5-dimethyl-4-chlorophenoxycarbonyloxy)-ethyl-N-butylaniline, N-β-[p-(2-phenylisopropyl)-phenoxy-carbonyloxy]-ethyl-N-butylaniline, N-β-(m-chlorophenoxy-carbonyloxy)-ethyl-N-butylaniline, N-

β-(2,5-dichlorophenoxy-carbonyloxy)-ethyl-N-butylaniline, N-β-(2,4,5-trichlorophenoxy-carbonyloxy)-ethyl-N-butylaniline, N-β-phenoxycarbonyloxy-ethyl-N-ethyl-3-chloroaniline, N-β-(β'-phenoxycarbonyloxy-ethyloxy)-ethyl-N-ethyl-3-chloroaniline, N-γ-(phenoxy-carbonyloxy)-propyl-N-ethyl-3-chloroaniline, N-β-(p-chlorophenoxy-carbonyloxy)-ethyl-N-ethyl-3-chloroaniline, N-β-(o-chlorophenoxy-carbonyloxy)-ethyl-N-ethyl-3-chloroaniline, N-β-(p-methylphenoxy-carbonyloxy)-ethyl-N-ethyl-3-chloroaniline, N-β-(o-methylphenoxy-carbonyloxy)-ethyl-N-ethyl-3-chloroaniline, N-β-(p-ethylphenoxy-carbonyloxy)-ethyl-N-ethyl-3-chloroaniline, N-β-(o-ethylphenoxy-carbonyloxy)-ethyl-N-ethyl-3-chloroaniline, N-β-(m-methylphenoxy-carbonyloxy)-ethyl-N-ethyl-3-chloroaniline, N-β-(p-cyclohexylphenoxycarbonyloxy)-ethyl-N-ethyl-3-chloroaniline, N-β-(β'-naphthoxycarbonyloxy)-ethyl-N-ethyl-3-chloroaniline, N-β-(o-isopropyloxyphenoxy-carbonyloxy)-ethyl-N-ethyl-3-chloroaniline, N-β-(o,p-dichlorophenoxy-carbonyloxy)-ethyl-N-ethyl-3-chloroaniline, N-β-(p-phenylphenoxy-carbonyloxy)-ethyl-N-ethyl-3-chloroaniline, N-β-(p-benzylphenoxy-carbonyloxy)-ethyl-N-ethyl-3-chloroaniline, N-β-(o-benzylphenoxy-carbonyloxy)-ethyl-N-ethyl-3-chloroaniline, N-β-(p-tert.-butylphenoxy-carbonyloxy)-ethyl-N-ethyl-3-chloroaniline, N-β-(p-methoxyphenoxy-carbonyloxy)-ethyl-N-ethyl-3-chloroaniline, N-β-(o-isopropylphenoxycarbonyloxy)-ethyl-N-ethyl-3-chloroaniline, N-δ-(phenoxycarbonyloxy)-butyl-N-ethyl-3-chloroaniline, N-β-(3,5-dimethylphenoxy-carbonyloxy)-ethyl-N-ethyl-3-chloroaniline, N-β-(3,5-dimethyl-4-chlorophenyl-carbonyloxy)-ethyl-N-ethyl-3-chloroaniline, N-β-[p-(2-phenylisopropyl)-phenoxy-carbonyloxy]-ethyl-N-ethyl-3-chloroaniline, N-β-(m-chlorophenoxy-carbonyloxy)-ethyl-N-ethyl-3-chloroaniline, N-β-(2,5-dichlorophenoxycarbonyloxy)-ethyl-N-ethyl-3-chloroaniline, N-β-(2,4,5-trichlorophenoxy-carbonyloxy)-ethyl-N-ethyl-3-chloroaniline, N-β-phenoxy-carbonyloxy-ethyl-N-ethyl-m-anisidine, N-β-(β'-phenoxy-carbonyloxy-ethyloxy)-ethyl-N-ethyl-m-anisidine, N-γ-(phenoxy-carbonyloxy)-propyl-N-ethyl-m-anisidine, N-β-(p-chlorphenoxy-carbonyloxy)-ethyl-N-ethyl-m-anisidine, N-β-(o-chlorophenoxy-carbonyloxy)-ethyl-N-ethyl-m-anisidine, N-β-(p-methyl-phenoxy-carbonyloxy)-ethyl-N-ethyl-m-anisidine, N-β-(o-methylphenoxy-carbonyloxy)-ethyl-N-ethyl-m-anisidine, N-β-(p-ethylphenoxy-carbonyloxy)-ethyl-N-ethyl-m-anisidine, N-β-(o-ethylphenoxy-carbonyloxy)-ethyl-N-ethyl-m-anisidine, N-β-(m-methylphenoxy-carbonyloxy)-ethyl-N-ethyl-m-anisidine, N-β-(p-cyclohexylphenoxy-carbonyloxy)-ethyl-N-ethyl-m-anisidine, N-β-(β'-naphthoxy-carbonyloxy)-ethyl-N-ethyl-m-anisidine, N-β-(o-isopropyloxyphenoxy-carbonyloxy)-ethyl-N-ethyl-m-anisidine, N-β-(o,p-dichlorophenoxy-carbonyloxy)-ethyl-N-ethyl-m-anisidine, N-β-(p-phenylphenoxy-carbonyloxy)-ethyl-N-ethyl-m-anisidine, N-β-(p-benzylphenoxy-carbonyloxy)-ethyl-N-ethyl-m-anisidine, N-β-(o-benzylphenoxy-carbonyloxy)-ethyl-N-ethyl-m-anisidine, N-β-(p-tert.-butyl-phenoxy-carbonyloxy)-ethyl-N-ethyl-m-anisidine, N-β-(p-methoxyphenoxy-carbonyloxy)-ethyl-N-ethyl-m-anisidine, N-β-(o-isopropylphenoxy-carbonyloxy)-ethyl-N-ethyl-m-anisidine, N-δ-(phenoxy-carbonyloxy)-butyl-N-ethyl-m-anisidine, N-β-(3,5-dimethyl-phenoxy-carbonyloxy)-ethyl-N-ethyl-m-anisidine, N-β-(3,5-dimethyl-4-chlorophenoxy-carbonyloxy)-ethyl-N-ethyl-m-anisidine, N-β-[p-(2-phenylisopropyl)-phenoxycarbonyloxy]-ethyl-N-ethyl-m-anisidine, N-β-(m-chlorophenoxycarbonyloxy)-ethyl-N-ethyl-m-anisidine, N-β-(2,5-dichlorophenoxy-carbonyloxy)-ethyl-N-ethyl-m-anisidine, N-β-(2,4,5-trichlorophenoxy-carbonyloxy)-ethyl-N-ethyl-m-anisidine, N-β-phenoxycarbonyloxy-ethyl-N-ethyl-m-toluidine, N-β-(β'-phenoxy-carbonyloxy-ethyloxy)-ethyl-N-ethyl-m-toluidine, N-γ-(phenoxy-carbonyloxy)-propyl-N-ethyl-m-toluidine, N-β-(p-chlorophenoxy-carbonyloxy)-ethyl-N-ethyl-m-toluidine, N-β-(o-chlorophenoxy-carbonyloxy)-ethyl-N-ethyl-m-toluidine, N-β-(p-methylphenoxy-carbonyloxy)-ethyl-N-ethyl-m-toluidine, N-β-(o-methylphenoxy-carbonyloxy)-ethyl-N-ethyl-m-toluidine, N-β-(p-ethylphenoxy-carbonyloxy)-ethyl-N-ethyl-m-toluidine, N-β-(o-ethylphenoxy-carbonyloxy)-ethyl-N-ethyl-m-toluidine, N-β-(m-methylphenoxy-carbonyloxy)-ethyl-N-ethyl-m-toluidine, N-β-(p-cyclohexylphenoxy-carbonyloxy)-ethyl-N-ethyl-m-toluidine, N-β-(β'-naphthoxy-carbonyloxy)-ethyl-N-ethyl-m-toluidine, N-β-(o-isopropyloxyphenoxy-carbonyloxy)-ethyl-N-ethyl-m-toluidine, N-β-(o,p-dichlorophenoxy-carbonyloxy)-ethyl-N-ethyl-m-toluidine, N-β-(p-phenylphenoxy-carbonyloxy)-ethyl-N-ethyl-m-toluidine, N-β-(p-benzylphenoxy-carbonyloxy)-ethyl-N-ethyl-m-toluidine, N-β-(o-benzylphenoxy-carbonyloxy)-ethyl-N-ethyl-m-toluidine, N-β-(p-tert.-butylphenoxy-carbonyloxy)-ethyl-N-ethyl-m-toluidine, N-β-(p-methoxyphenoxy-carbonyloxy)-ethyl-N-ethyl-m-toluidine, N-β-(o-isopropylphenoxy-carbonyloxy)-ethyl-N-ethyl-m-toluidine, N-δ-(phenoxy-carbonyloxy)-butyl-N-ethyl-m-toluidine, N-β-(3,5-dimethylphenoxy-carbonyloxy)-ethyl-N-ethyl-m-toluidine, N-β-(3,5-dimethyl-4-chlorophenoxy-carbonyloxy)-ethyl-N-ethyl-m-toluidine, N-β-[p-(2-phenylisopropyl)-phenoxy-carbonyloxy]-ethyl-N-ethyl-m-toluidine, N-β-(m-chlorophenoxy-carbonyloxy)-ethyl-N-ethyl-m-toluidine, N-β-(2,5-dichlorophenoxy-carbonyloxy)-ethyl-N-ethyl-m-toluidine, N-β-(2,4,5-trichlorophenoxy-carbonyloxy)-ethyl-N-ethyl-m-toluidine, N-β-(α'-naphthoxy-carbonyloxy)-ethyl-N-methylaniline, N-β-(α'-naphthoxy-carbonyloxy)-ethyl-N-ethyl-3-chloroaniline, N-β-(α'-naphthoxy-carbonyloxy)-ethyl-N-ethyl-3-methoxyaniline, N-β-(α'-naphthoxy-carbonyloxy)-ethyl-N-ethyl-m-toluidine, N-β-(o-methoxyphenoxy-carbonyloxy)-ethyl-N-ethylaniline, N-β-(phenoxycarbonyloxy)-ethyl-N-methyl-3-chloroaniline, N-β-(phenoxycarbonyloxy)-ethyl-N-methyl-3-methoxyaniline, N-β-(phenoxycarbonyloxy)-ethyl-N-methyl-m-toluidine, N-β-(phenoxycarbonyloxy)-ethyl-N-methyl-3-ethoxyaniline, N-β-(phenoxycarbonyloxy)-ethyl-N-ethyl-3-ethoxyaniline, N-β-(phenoxycarbonyloxy)-ethyl-N-butyl-3-chloroaniline, N-β-(phenoxycarbonyloxy)-ethyl-N-butyl-3-methoxyaniline, N-β-(phenoxycarbonyloxy)-ethyl-N-butyl-m-toluidine, N-β-(phenoxycarbonyloxy)-ethyl-N-butyl-3-ethoxyaniline, N-β-(phenoxycarbonyloxy)-ethyl-N-ethyl-2-methylaniline, N-β-(phenoxycarbonyloxy)-ethyl-N-ethyl-2-methoxyaniline, N-β-(phenoxycarbonyloxy)-ethyl-N-ethyl-3-acetylaminoaniline, N-β-(phenoxycarbonyloxy)-ethyl-N-ethyl-2-acetylaminoaniline, N-β-(phenoxycarbonyloxy)-ethyl-N-ethyl-2-phenoxyaniline, N-β-(phenoxycarbonyloxy)-ethyl-N-ethyl-2-benzyloxyaniline, N-β-(phenoxycarbonyloxy)-ethyl-N-ethyl-3-benzyloxyaniline, N-β-(o-phenylphenoxcarbonyloxy)-ethyl-N-ethyl-3-chloroaniline, N-β-(o-phenylphenoxycarbonyloxy)-ethyl-N-methylaniline, N-β-(o-phenylphenoxycarbonyloxy)-ethyl-N-butylaniline, N-β-(o-phenylphenoxycarbonyloxy)-ethyl-N-ethyl-m-anisidine, N-β-(phenoxycarbonyloxy)-ethyl-N-ethyl-3-trifluoromethylaniline, N-β-(phenoxycarbonyloxy)-ethyl-N-ethyl-2,3-dimethylaniline, N-β-(phenoxycarbonyloxy)-ethyl-N-ethyl-α-naphthylamine, N-β-(phenoxycarbonyloxy)-ethyl-N-ethyl-2-methoxy-5-chloroaniline, N-β-(phenoxycarbonyloxy)-ethyl-N-ethyl-2-phenoxy-5-chloroaniline, N-β-(phenoxycarbonyloxy)-ethyl-N-ethyl-2-methyl-5-methoxyaniline, N-β-(phenoxycarbonyloxy)-ethyl-N-ethyl-2,5-dimethoxyaniline, N-β-(phenoxycarbonyloxy)-ethyl-N-ethyl-2-methoxy-5-ethylsulphonylaniline, N-benzoylmethyl-N-methyl-3-chloroaniline, N-benzoylmethyl-N-methyl-3-methoxyaniline, N-benzoylmethyl-N-methyl-3-methylaniline, N-benzoylmethyl-N-methyl-3-ethoxyaniline, N-benzoylmethyl-N-ethyl-3-ethoxyaniline, N-benzoylmethyl-N-butyl-3-chloroaniline, N-benzoylmethyl-N-butyl-3-methoxyaniline, N-benzoylmethyl-N-butyl-3-methylaniline, N-benzoylmethyl-N-butyl-3-ethoxyaniline, N-benzoylmethyl-N-ethyl-2-methylaniline, N-benzoylmethyl-N-ethyl-2-methoxyaniline, N-benzoylmethyl-N-ethyl-3-acetylaminoaniline, N-benzoylmethyl-N-ethyl-2-acetylaminoaniline, N-benzoylmethyl-N-ethyl-3-benzyloxyaniline, N-benzoylmethyl-N-ethyl-2-phenoxyaniline, N-benzoylmethyl-N-ethyl-2-benzyloxyaniline, N-benzoylmethyl-N-ethyl-3-trifluoromethylaniline, N-benzoylmethyl-N-ethyl-2,3-dimethylaniline, N-benzoylmethyl-N-ethyl-α-naphthylamine, N-benzoylmethyl-N-ethyl-2-methoxy-5-chloroaniline, N-benzoylmethyl-N-ethyl-2-phenoxy-5-chloroaniline, N-benzoylmethyl-N-ethyl-2-methyl-5-methoxyaniline, N-benzoylmethyl-N-ethyl-2,5-dimethoxyaniline, N-benzoylmethyl-N-ethyl-2-methoxy-5-ethylsulphonylaniline, N-benzoylmethyl-N-methylaniline, N-benzoylmethyl-N-butylaniline, N-benzoylmethyl-N-ethyl-3-chloroaniline, N-benzoylmethyl-N-ethyl-3-methoxyaniline, N-4-chlorobenzoylmethyl-N-ethyl-3-methoxyaniline, N-4-chlorobenzoylmethyl-N-ethyl-3-chloroaniline, N-4-chlorobenzoylmethyl-N-methylaniline, N-4-chlorobenzoylmethyl-N-butylaniline, N-4-methylbenzoylmethyl-N-butylaniline, N-4-methylbenzoylmethyl-N-methylaniline, N-4-methylbenzoylmethyl-N-ethyl-3-methoxyaniline, N-4methylbenzoylmethyl-N-ethyl-3-chloroaniline, N-2,5-dimethylbenzoylmethyl-N-ethyl-3-chloroaniline, N-2,5-dimethylbenzoylmethyl-N-ethyl-3-methoxyaniline, N-2,5-dimethylbenzoylmethyl-N-butylaniline, N-2,5-dimethylbenzoylmethyl-N-methylaniline, N-2,5-propyl-N-benzoylmethyl-3-methoxyaniline, N-2,5-propyl-N-benzoylmethyl-3-chloroaniline, N-2,5-propyl-N-benzoylmethyl-3-methylaniline, N-β-chloroethyl-N-benzoylmethyl-3-methoxyaniline, N-β-chloroethyl-N-benzoylmethyl-3-chloroaniline, N-β-chloroethyl-N-benzoylmethyl-3-methylaniline, Nβ-carbonamidoethyl-N-benzoylmethyl-3-chloroaniline, N-β-carbonamidoethyl-N-benzoylmethyl-3-methoxyaniline, N-β-carbonamidoethyl-N-benzoylmethyl-3-methylaniline, N-β-acetoxyethyl-N-benzoylmethyl-3-chloroaniline, N-β-acetoxyethyl-N-benzoylmethyl-3-methoxyaniline, N-β-acetoxyethyl-N-benzoylmethyl-3-methylaniline, N-β-methoxyethyl-N-benzoylmethyl-3-methoxyaniline, N-β-cyanoethyl-N-benzoylmethyl-3-methoxyaniline, N-cyclohexyl-N-benzoylmethyl-3-methoxyaniline, N-cyclohexyl-N-benzoylmethyl-3-chloroaniline and N-cyclohexyl-N-benzoylmethyl-3-methylaniline.

The new dyestuffs are suitable for dyeing, printing and bulk dyeing of materials containing acid groups, above all of products which consist entirely or predominantly of polymerised unsaturated nitriles such as acrylonitrile and vinylidene cyanide or of acid-modified polyesters or of acid-modified polyamides. They are distinguished by a high affinity to the fibre. They are furthermore suitable for the other known applications of cationic dyestuffs, such as dyeing and printing of cellulose acetate, coir, jute, sisal and silk, of tannin-treated cotton and paper, for the preparation of ball pen pastes and rubber-stamp inks and for use in flexographic printing.

The dyeings and prints on the first-mentioned materials, especially on polyacrylonitrile, are distinguished by their very high level of fastness, above all by very good fastness to light, wet processing, rubbing, decatising, sublimation and perspiration.

The dyestuffs can be used individually or as mixtures.

The dyestuffs according to the invention and their mixtures are very suitable for dyeing shaped articles of polymers or copolymers of acrylonitrile, asymmetrical dicyanoethylene and acid-modified aromatic polyesters in chlorohydrocarbons as the dyebath, particularly if they carry substituents which assist the solubility in chlorohydrocarbons, such as, for example, the tertiary butyl group or the dodecyl group, or the anion $X^-$ is the anion of a monobasic organic acid with 4–30 carbon atoms.

EXAMPLE 1

18 g of 2-amino-6-methoxybenzthiazole are dissolved in a mixture of 120 ml of glacial acetic acid and 60 ml of water. 29 ml of 48% strength sulphuric acid are then added and the amount of nitrosylsulphuric acid corresponding to 7 g of sodium nitrite is added dropwise at −5° C. After stirring for a further 2 hours at this temperature, 1 g of amidosulphonic acid is added, the mixture is stirred for a further 10 minutes and this solution is then added gradually, at −5° C, to a suspension of 100 parts of ice, 5-parts of concentrated sulphuric acid and 32.2 parts of N-ethyl-N-β-phenoxycarbonyloxyethylaniline hydrochloride. The mixture is stirred for a further hour at −10° C and the product is diluted with water to about 600 ml and filtered off.

The azo dyestuff is suspended in water and the suspension is neutralised with sodium hydroxide solution. The product is then filtered off again, washed with water and dried in vacuo. The resulting black-violet powder is stirred into 150 ml of chloroform and 25 g of dimethyl sulphate are added dropwise at the boiling point of the chloroform. The mixture is then stirred for a further 90 minutes with reflux condensation and thereafter 900 ml of boiling water are added. In the course thereof, the chloroform distils off.

40 g of sodium chloride are added to the resulting solution at 50° C, the mixture is cooled and the dyestuff which has crystallised out is filtered off and dried in vacuo.

The dyestuff has the formula

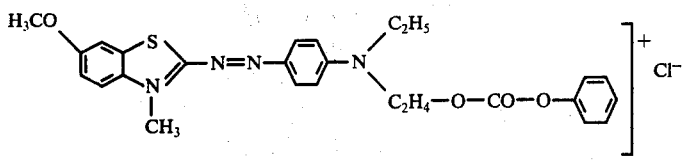

and dyes polyacrylonitrile fibres in a blue colour shade of outstanding fastness properties.

The dyestuff can also be prepared by carrying out the quaternisation with p-toluenesulphonic acid methyl ester or with methyl iodide instead of which dimethyl sulphate.

Valuable dyestuffs are also obtained when 2-amino-6-methoxybenzthiazole is coupled analogously with the anilines shown below and the azo dyestuff, after having been freed from acid, is methylated with dimethyl sulphate.

The colour shade obtained when dyeing polyacrylonitrile is also shown.

| Coupling component | Colour shade on PAN |
|---|---|
| N-β-(o-methylphenoxy-carbonyloxy)-ethyl-N-ethylaniline | blue |
| N-β-(p-ethylphenoxy-carbonyloxy)-ethyl-N-ethylaniline | " |
| N-β-(o-ethylphenoxy-carbonyloxy)-ethyl-N-ethylaniline | " |
| N-β-(m-methylphenoxy-carbonyloxy)-ethyl-N-ethylaniline | " |
| N-β-(p-cyclohexylphenoxy-carbonyloxy)-ethyl-N-ethylaniline | " |
| N-β-(β'-naphthoxy-carbonyloxy)-ethyl-N-ethylaniline | " |
| N-β-(o-isopropyloxyphenoxy-carbonyloxy)-ethyl-N-ethylaniline | " |
| N-β-(o,p-dichlorophenoxy-carbonyloxy)-ethyl-N-ethylaniline | " |
| N-β-(p-phenylphenoxy-carbonyloxy)-ethyl-N-ethylaniline | " |
| N-β-(p-benzylphenoxy-carbonyloxy)-ethyl-N-ethylaniline | " |
| N-β-(o-benzylphenoxy-carbonyloxy)-ethyl-N-ethylaniline | " |
| N-β-(p-tert.-butylphenoxy-carbonyloxy)-ethyl-N-ethylaniline | " |
| N-β-(p-methoxyphenoxy-carbonyloxy)-ethyl-N-ethylaniline | " |
| N-β-(o-isopropylphenoxy-carbonyloxy)-ethyl-N-ethylaniline | " |
| N-δ-(phenoxy-carbonyloxy)-butyl-N-ethylaniline | " |
| N-β-(3,5-dimethylphenoxy-carbonyloxy)-ethyl-N-ethylaniline | " |
| N-β-(3,5-dimethyl-4-chlorophenoxy-carbonyloxy)-ethyl-N-ethylaniline | " |
| N-β-[p-(2-phenylisopropyl)-phenoxy-carbonyloxy]-ethyl-N-ethylaniline | " |
| N-β-(m-chlorophenoxy-carbonyloxy)-ethyl-N-ethylaniline | " |
| N-β-(2,5-dichlorophenoxy-carbonyloxy)-ethyl-N-ethylaniline | " |
| N-β-(2,4,5-trichlorophenoxy-carbonyloxy)-ethyl-N-ethylaniline | " |
| N-β-(2,4-dimethylphenoxy-carbonyloxy)-ethyl-N-ethylaniline | " |
| N-β-(2,5-dimethylphenoxy-carbonyloxy)-ethyl-N-ethylaniline | " |
| N-β-(3-methyl-5-ethylphenoxy-carbonyloxy)-ethyl-N-ethylaniline | " |
| N-β-(2,3,5-trimethylphenoxy-carbonyloxy)-ethyl-N-ethylaniline | " |
| N-β-(o-sec.-butylphenoxy-carbonyloxy)-ethyl-N-ethylaniline | " |
| N-β-(2-isopropyl-5-methylphenoxy-carbonyloxy)-ethyl-N-ethylaniline | " |
| N-β-(3-methyl-5-isopropylphenoxy-carbonyloxy)-ethyl-N-ethylaniline | " |
| N-β-[p-(1,1,3,3-tetramethylbutyl)-phenoxy-carbonyloxy]-ethyl-N-ethylaniline | " |
| N-β-(nonylphenoxy-carbonyloxy)-ethyl-N-ethylaniline | " |
| N-β-(dodecylphenoxy-carbonyloxy)-ethyl-N-ethylaniline | " |
| N-β-(2,6-diisopropylphenoxy-carbonyloxy)-ethyl-N-ethylaniline | " |
| N-β-(2-cyclohexylphenoxy-carbonyloxy)-ethyl-N-ethylaniline | " |
| N-β-(α'-naphthoxy-carbonyloxy)-ethyl-N-ethylaniline | " |
| N-β-(o-phenylphenoxy-carbonyloxy)-ethyl-N-ethylaniline | " |
| N-β-(m-phenylphenoxy-carbonyloxy)-ethyl-N-ethylaniline | " |
| N-β-(β'-phenoxy-carbonyloxy-ethyloxy)-ethyl-N-ethylaniline | " |
| N-γ-(phenoxy-carbonyloxy)-propyl-N-ethylaniline | " |
| N-β-(p-chlorophenoxy-carbonyloxy)-ethyl-N-ethylaniline | " |
| N-β-(o-chlorophenoxy-carbonyloxy)-ethyl-N-ethylaniline | " |
| N-β-(p-methylphenoxy-carbonyloxy)-ethyl-N-ethylaniline | " |
| N-benzoyl-methyl-N-ethylaniline | " |
| N-4-chlorobenzoyl-methyl-N-ethylaniline | " |
| N-2-chlorobenzoyl-methyl-N-ethylaniline | " |
| N-2,4-dichlorobenzoyl-methyl-N-ethylaniline | " |
| N-2,5-dichlorobenzoyl-methyl-N-ethylaniline | " |
| N-4-bromobenzoyl-methyl-N-ethylaniline | " |
| N-β-(2,4,6-trichlorophenoxy-carbonyloxy)-ethyl-N-ethylaniline | " |
| N-β-(2,6-dichlorophenoxy-carbonyloxy)-ethyl-N-ethylaniline | " |
| N-β-(pentachlorophenoxy-carbonyloxy)-ethyl-N-ethylaniline | " |
| N-β-(2-chloro-6-methylphenoxy-carbonyloxy)-ethyl-N-ethylaniline | " |
| N-β-(2-methyl-5-chlorophenoxy-carbonyloxy)-ethyl-N-ethylaniline | " |
| N-β-(2-methyl-4-chlorophenoxy-carbonyloxy)-ethyl-N-ethylaniline | " |
| N-β-(2-methyl-3-chlorophenoxy-carbonyloxy)-ethyl-N-ethylaniline | " |
| N-β-(2-chloro-5-methylphenoxy-carbonyloxy)-ethyl-N-ethylaniline | " |
| N-β-(3-methyl-4-chlorophenoxy-carbonyloxy)-ethyl-N-ethylaniline | " |
| N-β-(2,4,6-trichloro-3-methylphenoxy-carbonyloxy)-ethyl-N-ethylaniline | " |
| N-β-(2,3-dimethylphenoxy-carbonyloxy)-ethyl-N-ethylaniline | " |
| N-β-(3,4-dimethylphenoxy-carbonyloxy)-ethyl-N-ethylaniline | " |
| N-β-(2,6-dimethylphenoxy-carbonyloxy)-ethyl-N-ethylaniline | " |
| N-β-(o-ethoxy-phenoxy-carbonyloxy)-ethyl-N-ethylaniline | " |
| N-β-(m-methoxyphenoxy-carbonyloxy)-ethyl-N-ethylaniline | " |
| N-β-(p-phenylsulphonylphenoxy-carbonyloxy)-ethyl-N-ethylaniline | " |
| N-β-(p-methoxycarbonylphenoxy-carbonyloxy)-ethyl-N-ethylaniline | " |
| N-β-phenoxy-carbonyloxy-n-butyl-N-ethylaniline | " |
| N-(1-phenoxy-carbonyloxy)-sec.-butyl-N-ethylaniline | " |
| N-(1-phenoxycarbonyloxy)-i-propyl-N-ethylaniline | " |
| N,N-bis-(β-phenoxycarbonyloxyethyl)-aniline | " |
| N-cyclohexyl-N-β-phenoxycarbonyloxyethyl-aniline | " |
| N-benzyl-N-β-phenoxycarbonyloxyethyl-aniline | " |

-continued

| Coupling component | Colour shade on PAN |
|---|---|
| N-n-propyl-N-β-phenoxycarbonyloxyethyl-aniline | " |
| N-β-chloroethyl-N-β-phenoxycarbonyloxyethyl-aniline | " |
| N-β-bromoethyl-N-β-phenoxycarbonyloxyethyl-aniline | " |
| N-β-cyanoethyl-N-β-phenoxycarbonyloxyethyl-aniline | " |
| N-β-acetoxyethyl-N-β-phenoxycarbonyloxyethyl-aniline | " |
| N-β-methoxyethyl-N-β-phenoxycarbonyloxyethyl-aniline | " |
| N-β-butoxyethyl-N-β-phenoxycarbonyloxyethyl-aniline | " |
| N-β-hydroxy-n-butyl-N-β-phenoxycarbonyloxyethyl-aniline | " |
| N-β-hydroxy-n-propyl-N-β-phenoxycarbonyloxyethyl-aniline | " |
| N-cyanomethyl-N-β-phenoxycarbonyloxyethyl-aniline | " |
| N-β-carbonamidoethyl-N-β-phenoxycarbonyloxyethyl-aniline | " |
| N-4-methylbenzoyl-methyl-N-ethylaniline | " |
| N-2,4-dimethylbenzoyl-methyl-N-ethylaniline | " |
| N-2,5-dimethylbenzoyl-methyl-N-ethylaniline | " |
| N-2,4,5-trimethylbenzoyl-methyl-N-ethylaniline | " |
| N-4-ethylbenzoyl-methyl-N-ethylaniline | " |
| N-3,4-dimethylbenzoyl-methyl-N-ethylaniline | " |
| N-2,3,4,5-tetramethylbenzoyl-methyl-N-ethylaniline | " |
| N-naphthoyl-methyl-N-ethylaniline | " |
| N-cyclohexyl-N-benzoylmethyl-N-ethylaniline | " |
| N-benzyl-N-benzoylmethyl-N-ethylaniline | " |
| N-n-propyl-N-benzoylmethyl-N-ethylaniline | " |
| N-β-chloroethyl-N-benzoylmethyl-N-ethylaniline | " |
| N-β-cyanoethyl-N-benzoylmethyl-N-ethylaniline | " |
| N-β-acetoxyethyl-N-benzoylmethyl-N-ethylaniline | " |
| N-β-methoxyethyl-N-benzoylmethyl-N-ethylaniline | " |
| N-β-ethoxyethyl-N-benzoylmethyl-N-ethylaniline | " |
| N-β-butoxyethyl-N-benzoylmethyl-N-ethylaniline | " |
| N-cyanomethyl-N-benzoylmethyl-N-ethylaniline | " |
| N-β-carbonamidoethyl-N-benzoylmethyl-N-ethylaniline | " |
| N-β-(o-methylphenoxy-carbonyloxy)-ethyl-N-methylaniline | " |
| N-β-(p-ethylphenoxy-carbonyloxy)-ethyl-N-methylaniline | " |
| N-β-(o-ethylphenoxy-carbonyloxy)-ethyl-N-methylaniline | " |
| N-β-(m-methylphenoxy-carbonyloxy)-ethyl-N-methylaniline | " |
| N-β-(p-cyclohexylphenoxy-carbonyloxy)-ethyl-N-methylaniline | " |
| N-β-(β'-naphthoxy-carbonyloxy)-ethyl-N-methylaniline | " |
| N-β-(o-isopropyloxyphenoxy-carbonyloxy)-ethyl-N-methylaniline | " |
| N-β-(o,p-dichlorophenoxy-carbonyloxy)-ethyl-N-methylaniline | " |
| N-β-(p-phenylphenoxy-carbonyloxy)-ethyl-N-methylaniline | " |
| N-β-(p-benzylphenoxy-carbonyloxy)-ethyl-N-methylaniline | " |
| N-β-(o-benzylphenoxy-carbonyloxy)-ethyl-N-methylaniline | " |
| N-β-(p-tert.-butylphenoxy-carbonyloxy)-ethyl-N-methylaniline | " |
| N-β-(p-methoxyphenoxy-carbonyloxy)-ethyl-N-methylaniline | " |
| N-β-(o-isopropylphenoxy-carbonyloxy)-ethyl-N-methylaniline | " |
| N-δ-(phenoxy-carbonyloxy)-butyl-N-methylaniline | " |
| N-β-(3,5-dimethylphenoxy-carbonyloxy)-ethyl-N-methylaniline | " |
| N-β-(3,5-dimethyl-4-chlorophenoxy-carbonyloxy)-ethyl-N-methylaniline | " |
| N-β-[p-(2-phenylisopropyl)-phenoxy-carbonyloxy]-ethyl-N-methylaniline | " |
| N-β-(m-chlorophenoxy-carbonyloxy)-ethyl-N-methylaniline | " |
| N-β-(2,5-dichlorophenoxy-carbonyloxy)-ethyl-N-methylaniline | " |
| N-β-(2,4,5-trichlorophenoxy-carbonyloxy)-ethyl-N-methylaniline | " |
| N-β-(o,p-dichlorophenoxy-carbonyloxy)-ethyl-N-butylaniline | " |
| N-β-(p-phenylphenoxy-carbonyloxy)-ethyl-N-butylaniline | " |
| N-β-(p-benzylphenoxy-carbonyloxy)-ethyl-N-butylaniline | " |
| N-β-(o-benzylphenoxy-carbonyloxy)-ethyl-N-butylaniline | " |
| N-β-(p-tert.-butylphenoxy-carbonyloxy)-ethyl-N-butylaniline | " |
| N-β-(p-methoxyphenoxy-carbonyloxy)-ethyl-N-butylaniline | " |
| N-β-(o-isopropylphenoxy-carbonyloxy)-ethyl-N-butylaniline | " |
| N-δ-(phenoxy-carbonyloxy)-butyl-N-butylaniline | " |
| N-β-(3,5-dimethylphenoxy-carbonyloxy)-ethyl-N-butylaniline | " |
| N-β-(3,5-dimethyl-4-chlorophenoxy-carbonyloxy)-ethyl-N-butylaniline | " |
| N-β-[p-(2-phenylisopropyl)-phenoxy-carbonyloxy]-ethyl-N-butylaniline | " |
| N-β-(m-chlorophenoxy-carbonyloxy)-ethyl-N-butylaniline | " |
| N-β-(2,5-dichlorophenoxy-carbonyloxy)-ethyl-N-butylaniline | " |
| N-β-(2,4,5-trichlorophenoxy-carbonyloxy)-ethyl-N-butylaniline | " |
| N-β-phenoxy-carbonyloxy-ethyl-N-methylaniline | " |
| N-β-(β'-phenoxy-carbonyloxy-ethyloxy)-ethyl-N-methylaniline | " |
| N-γ-(phenoxy-carbonyloxy)-propyl-N-methylaniline | " |
| N-β-(p-chlorophenoxy-carbonyloxy)-ethyl-N-methylaniline | " |
| N-β-(o-chlorophenoxy-carbonyloxy)-ethyl-N-methylaniline | " |
| N-β-(p-methylphenoxy-carbonyloxy)-ethyl-N-methylaniline | " |
| N-δ-(phenoxy-carbonyloxy)-butyl-N-ethyl-3-chloroaniline | " |
| N-β-(3,5-dimethylphenoxy-carbonyloxy)-ethyl-N-ethyl-3-chloroaniline | " |
| N-β-(3,5-dimethyl-4-chlorophenoxy-carbonyloxy)-ethyl-N-ethyl-3-chloroaniline | " |
| N-β-[p-(2-phenylisopropyl)-phenoxy-carbonyloxy]-ethyl-N-ethyl-3-chloroaniline | " |
| N-β-(m-chlorophenoxy-carbonyloxy)-ethyl-N-ethyl-3-chloroaniline | " |
| N-β-(2,5-dichlorophenoxy-carbonyloxy)-ethyl-N-ethyl-3-chloroaniline | " |
| N-β-(2,4,5-trichlorophenoxy-carbonyloxy)-ethyl-N-ethyl-3-chloroaniline | " |
| N-β-phenoxy-carbonyloxy-ethyl-N-butylaniline | " |
| N-β-(β'-phenoxy-carbonyloxy-ethyloxy)-ethyl-N-butylaniline | " |
| N-γ-(phenoxy-carbonyloxy)-propyl-N-butylaniline | " |
| N-β-(p-chlorophenoxy-carbonyloxy)-ethyl-N-butylaniline | " |
| N-β-(o-chlorophenoxy-carbonyloxy)-ethyl-N-butylaniline | " |
| N-β-(p-methylphenoxy-carbonyloxy)-ethyl-N-butylaniline | " |
| N-β-(o-methylphenoxy-carbonyloxy)-ethyl-N-butylaniline | " |
| N-β-(p-ethylphenoxy-carbonyloxy)-ethyl-N-butylaniline | " |
| N-β-(o-ethylphenoxy-carbonyloxy)-ethyl-N-butylaniline | " |
| N-β-(m-methylphenoxy-carbonyloxy)-ethyl-N-butylaniline | " |
| N-β-(p-cyclohexylphenoxy-carbonyloxy)-ethyl-N-butylaniline | " |
| N-β-(β'-naphthoxy-carbonyloxy)-ethyl-N-butylaniline | " |
| N-β-(o-isopropyloxyphenoxy-carbonyloxy)-ethyl-N-butylaniline | " |

-continued

| Coupling component | Colour shade on PAN |
|---|---|
| N-β-phenoxy-carbonyloxy-ethyl-N-ethyl-3-chloroaniline | " |
| N-β-(β'-phenoxy-carbonyloxy-ethyloxy)-ethyl-N-ethyl-3-chloroaniline | " |
| N-γ-(phenoxy-carbonyloxy)-propyl-N-ethyl-3-chloroaniline | " |
| N-β-(p-chlorophenoxy-carbonyloxy)-ethyl-N-ethyl-3-chloroaniline | " |
| N-β-(o-chlorophenoxy-carbonyloxy)-ethyl-N-ethyl-3-chloroaniline | " |
| N-β-(p-methylphenoxy-carbonyloxy)-ethyl-N-ethyl-3-chloroaniline | " |
| N-β-(o-methylphenoxy-carbonyloxy)-ethyl-N-ethyl-3-chloroaniline | " |
| N-β-(p-ethylphenoxy-carbonyloxy)-ethyl-N-ethyl-3-chloroaniline | " |
| N-β-(o-ethylphenoxy-carbonyloxy)-ethyl-N-ethyl-3-chloroaniline | " |
| N-β-(m-methylphenoxy-carbonyloxy)-ethyl-N-ethyl-3-chloroaniline | " |
| N-β-(p-cyclohexylphenoxy-carbonyloxy)-ethyl-N-ethyl-3-chloroaniline | " |
| N-β-(β'-naphthoxy-carbonyloxy)-ethyl-N-ethyl-3-chloroaniline | " |
| N-β-(o-isopropyloxyphenoxy-carbonyloxy)-ethyl-N-ethyl-3-chloroaniline | " |
| N-β-(o,p-dichlorophenoxy-carbonyloxy)-ethyl-N-ethyl-3-chloroaniline | " |
| N-β-(p-phenylphenoxy-carbonyloxy)-ethyl-N-ethyl-3-chloroaniline | " |
| N-β-(p-benzylphenoxy-carbonyloxy)-ethyl-N-ethyl-3-chloroaniline | " |
| N-β-(o-benzylphenoxy-carbonyloxy)-ethyl-N-ethyl-3-chloroaniline | " |
| N-β-(p-tert.-butylphenoxy-carbonyloxy)-ethyl-N-ethyl-3-chloroaniline | " |
| N-β-(p-methoxyphenoxy-carbonyloxy)-ethyl-N-ethyl-3-chloroaniline | " |
| N-β-(o-isopropylphenoxy-carbonyloxy)-ethyl-N-ethyl-3-chloroaniline | " |
| N-β-(o-methylphenoxy-carbonyloxy)-ethyl-N-ethyl-m-anisidine | reddish-tinged blue |
| N-β-(p-ethylphenoxy-carbonyloxy)-ethyl-N-ethyl-m-anisidine | " |
| N-β-(o-ethylphenoxy-carbonyloxy)-ethyl-N-ethyl-m-anisidine | " |
| N-β-(m-methylphenoxy-carbonyloxy)-ethyl-N-ethyl-m-anisidine | " |
| N-β-(p-cyclohexylphenoxy-carbonyloxy)-ethyl-N-ethyl-m-anisidine | " |
| N-β-(β'-naphthoxy-carbonyloxy)-ethyl-N-ethyl-m-anisidine | " |
| N-β-(o-isopropyloxyphenoxy-carbonyloxy)-ethyl-N-ethyl-m-anisidine | " |
| N-β-(o,p-dichlorophenoxy-carbonyloxy)-ethyl-N-ethyl-m-anisidine | " |
| N-β-(p-phenylphenoxy-carbonyloxy)-ethyl-N-ethyl-m-anisidine | " |
| N-β-(p-benzylphenoxy-carbonyloxy)-ethyl-N-ethyl-m-anisidine | " |
| N-β-(o-benzylphenoxy-carbonyloxy)-ethyl-N-ethyl-m-anisidine | " |
| N-β-(p-tert.-butylphenoxy-carbonyloxy)-ethyl-N-ethyl-m-anisidine | " |
| N-β-(p-methoxyphenoxy-carbonyloxy)-ethyl-N-ethyl-m-anisidine | " |
| N-β-(o-isopropylphenoxy-carbonyloxy)-ethyl-N-ethyl-m-anisidine | " |
| N-δ-(phenoxy-carbonyloxy)-butyl-N-ethyl-m-anisidine | " |
| N-β-(3,5-dimethylphenoxy-carbonyloxy)-ethyl-N-ethyl-m-anisidine | " |
| N-β-(3,5-dimethyl-4-chlorophenoxy-carbonyloxy)-ethyl-N-ethyl-m-anisidine | " |
| N-β-[p-(2-phenylisopropyl)-phenoxy-carbonyloxy]-ethyl-N-ethyl-m-anisidine | " |
| N-β-(m-chlorophenoxy-carbonyloxy)-ethyl-N-ethyl-m-anisidine | " |
| N-β-(2,5-dichlorophenoxy-carbonyloxy)-ethyl-N-ethyl-m-anisidine | " |
| N-β-(2,4,5-trichlorophenoxy-carbonyloxy)-ethyl-N-ethyl-m-anisidine | " |
| N-β-(o,p-dichlorophenoxy-carbonyloxy)-ethyl-N-ethyl-m-toluidine | blue |
| N-β-(p-phenylphenoxy-carbonyloxy)-ethyl-N-ethyl-m-toluidine | " |
| N-β-(p-benzylphenoxy-carbonyloxy)-ethyl-N-ethyl-m-toluidine | " |
| N-β-(o-benzylphenoxy-carbonyloxy)-ethyl-N-ethyl-m-toluidine | " |
| N-β-(p-tert.-butylphenoxy-carbonyloxy)-ethyl-N-ethyl-m-toluidine | " |
| N-β-(p-methoxyphenoxy-carbonyloxy)-ethyl-N-ethyl-m-toluidine | " |
| N-β-(o-isopropylphenoxy-carbonyloxy)-ethyl-N-ethyl-m-toluidine | " |
| N-δ-(phenoxy-carbonyloxy)-butyl-N-ethyl-m-toluidine | " |
| N-β-(3,5-dimethylphenoxy-carbonyloxy)-ethyl-N-ethyl-m-toluidine | " |
| N-β-(3,5-dimethyl-4-chlorophenoxy-carbonyloxy)-ethyl-N-ethyl-m-toluidine | " |
| N-β-[p-(2-phenylisopropyl)-phenoxy-carbonyloxy]-ethyl-N-ethyl-m-toluidine | " |
| N-β-(m-chlorophenoxy-carbonyloxy)-ethyl-N-ethyl-m-toluidine | " |
| N-β-(2,5-dichlorophenoxy-carbonyloxy)-ethyl-N-ethyl-m-toluidine | " |
| N-β-(2,4,5-trichlorophenoxy-carbonyloxy)-ethyl-N-ethyl-m-toluidine | " |
| N-β-phenoxy-carbonyloxy-ethyl-N-ethyl-m-anisidine | reddish-tinged blue |
| N-β-(β'-phenoxy-carbonyloxy-ethyloxy)-ethyl-N-ethyl-m-anisidine | " |
| N-γ-(phenoxy-carbonyloxy)-propyl-N-ethyl-m-anisidine | " |
| N-β-(p-chlorophenoxy-carbonyloxy)-ethyl-N-ethyl-m-anisidine | " |
| N-β-(o-chlorophenoxy-carbonyloxy)-ethyl-N-ethyl-m-anisidine | " |
| N-β-(p-methylphenoxy-carbonyloxy)-ethyl-N-ethyl-m-anisidine | " |
| N-β-phenoxy-carbonyloxy-ethyl-N-ethyl-m-toluidine | blue |
| N-β-(β'-phenoxy-carbonyloxy-ethyloxy)-ethyl-N-ethyl-m-toluidine | " |
| N-γ-(phenoxy-carbonyloxy)-propyl-N-ethyl-m-toluidine | " |
| N-β-(p-chlorophenoxy-carbonyloxy)-ethyl-N-ethyl-m-toluidine | " |
| N-β-(o-chlorophenoxy-carbonyloxy)-ethyl-N-ethyl-m-toluidine | " |
| N-β-(p-methylphenoxy-carbonyloxy)-ethyl-N-ethyl-m-toluidine | " |
| N-β-(o-methylphenoxy-carbonyloxy)-ethyl-N-ethyl-m-toluidine | " |
| N-β-(p-ethylphenoxy-carbonyloxy)-ethyl-N-ethyl-m-toluidine | " |
| N-β-(o-ethylphenoxy-carbonyloxy)-ethyl-N-ethyl-m-toluidine | " |
| N-β-(m-methylphenoxy-carbonyloxy)-ethyl-N-ethyl-m-toluidine | " |
| N-β-(p-cyclohexylphenoxy-carbonyloxy)-ethyl-N-ethyl-m-toluidine | " |
| N-β-(β'-naphthoxy-carbonyloxy)-ethyl-N-ethyl-m-toluidine | " |
| N-β-(o-isopropyloxyphenoxy-carbonyloxy)-ethyl-N-ethyl-m-toluidine | " |
| N-β-(α'-naphthoxy-carbonyloxy)-ethyl-N-methylaniline | " |
| N-β-(α'-naphthoxy-carbonyloxy)-ethyl-N-ethyl-3-chloroaniline | " |
| N-β-(α'-naphthoxy-carbonyloxy)-ethyl-N-ethyl-3-methoxyaniline | reddish-tinged blue |
| N-β-(α'-naphthoxy-carbonyloxy)-ethyl-N-ethyl-m-toluidine | blue |
| N-β-(o-methoxy-phenoxy-carbonyloxy)-ethyl-N-ethylaniline | " |
| N-β-(phenoxycarbonyloxy)-ethyl-N-methyl-3-chloroaniline | " |
| N-β-(phenoxycarbonyloxy)-ethyl-N-methyl-3-methoxyaniline | reddish-tinged blue |
| N-β-(phenoxycarbonyloxy)-ethyl-N-methyl-m-toluidine | blue |
| N-β-(phenoxycarbonyloxy)-ethyl-N-methyl-3-ethoxyaniline | reddish-tinged blue |
| N-β-(phenoxycarbonyloxy)-ethyl-N-ethyl-3-ethoxyaniline | " |
| N-β-(phenoxycarbonyloxy)-ethyl-N-butyl-3-chloroaniline | blue |
| N-β-(phenoxycarbonyloxy)-ethyl-N-butyl-3-methoxyaniline | reddish-tinged blue |
| N-β-(phenoxycarbonyloxy)-ethyl-N-butyl-m-toluidine | blue |
| N-β-(phenoxycarbonyloxy)-ethyl-N-butyl-3-ethoxyaniline | reddish-tinged blue |
| N-β-(phenoxycarbonyloxy)-ethyl-N-ethyl-2-methylaniline | blue |
| N-β-(phenoxycarbonyloxy)-ethyl-N-ethyl-2-methoxyaniline | " |
| N-β-(phenoxycarbonyloxy)-ethyl-N-ethyl-3-acetylaminoaniline | " |
| N-β-(phenoxycarbonyloxy)-ethyl-N-ethyl-2-acetylaminoaniline | " |
| N-β-(phenoxycarbonyloxy)-ethyl-N-ethyl-2-phenoxyaniline | " |

-continued

| Coupling component | Colour shade on PAN |
|---|---|
| N-β-(phenoxycarbonyloxy)-ethyl-N-ethyl-2-benzyloxyaniline | " |
| N-β-(phenoxycarbonyloxy)-ethyl-N-ethyl-3-benzyloxyaniline | " |
| N-β-(o-phenylphenoxycarbonyloxy)-ethyl-N-ethyl-3-chloroaniline | " |
| N-β-(o-phenylphenoxycarbonyloxy)-ethyl-N-methylaniline | " |
| N-β-(o-phenylphenoxycarbonyloxy)-ethyl-N-butylaniline | " |
| N-β-(o-phenylphenoxycarbonyloxy)-ethyl-N-ethyl-m-anisidine | reddish-tinged blue |
| N-β-(phenoxycarbonyloxy)-ethyl-N-ethyl-3-trifluoromethylaniline | blue |
| N-β-(phenoxycarbonyloxy)-ethyl-N-ethyl-2,3-dimethylaniline | " |
| N-β-(phenoxycarbonyloxy)-ethyl-N-ethyl-α-naphthylamine | " |
| N-β-(phenoxycarbonyloxy)-ethyl-N-ethyl-2-methoxy-5-chloroaniline | " |
| N-β-(phenoxycarbonyloxy)-ethyl-N-ethyl-2-phenoxy-5-chloroaniline | " |
| N-β-(phenoxycarbonyloxy)-ethyl-N-ethyl-2-methyl-5-methoxyaniline | " |
| N-β-(phenoxycarbonyloxy)-ethyl-N-ethyl-2,5-dimethoxyaniline | " |
| N-β-(phenoxycarbonyloxy)-ethyl-N-ethyl-2-methoxy-5-ethylsulphonylaniline | " |
| N-benzoylmethyl-N-methyl-3-chloroaniline | " |
| N-benzoylmethyl-N-methyl-3-methoxyaniline | reddish-tinged blue |
| N-benzoylmethyl-N-methyl-3-methylaniline | blue |
| N-benzoylmethyl-N-methyl-3-ethoxyaniline | reddish-tinged blue |
| N-benzoylmethyl-N-ethyl-3-ethoxyaniline | " |
| N-benzoylmethyl-N-butyl-3-chloroaniline | blue |
| N-benzoylmethyl-N-butyl-3-methoxyaniline | reddish-tinged blue |
| N-benzoylmethyl-N-butyl-3-methylaniline | blue |
| N-benzoylmethyl-N-butyl-3-ethoxyaniline | reddish-tinged blue |
| N-benzoylmethyl-N-ethyl-2-methylaniline | blue |
| N-benzoylmethyl-N-ethyl-2-methoxyaniline | " |
| N-benzoylmethyl-N-ethyl-3-acetylaminoaniline | " |
| N-benzoylmethyl-N-ethyl-2-acetylaminoaniline | " |
| N-benzoylmethyl-N-ethyl-3-benzyloxyaniline | " |
| N-benzoylmethyl-N-ethyl-2-phenoxyaniline | " |
| N-benzoylmethyl-N-ethyl-2-benzyloxyaniline | " |
| N-benzoylmethyl-N-ethyl-3-trifluoromethylaniline | " |
| N-benzoylmethyl-N-ethyl-2,3-dimethylaniline | " |
| N-benzoylmethyl-N-ethyl-α-naphthylamine | " |
| N-benzoylmethyl-N-ethyl-2-methoxy-5-chloroaniline | " |
| N-benzoylmethyl-N-ethyl-2-phenoxy-5-chloroaniline | " |
| N-benzoylmethyl-N-ethyl-2-methyl-5-methoxyaniline | " |
| N-benzoylmethyl-N-ethyl-2,5-dimethoxyaniline | " |
| N-benzoylmethyl-N-ethyl-2-methoxy-5-ethylsulphonylaniline | " |
| N-benzoylmethyl-N-methylaniline | " |
| N-benzoylmethyl-N-butylaniline | " |
| N-benzoylmethyl-N-ethyl-3-chloroaniline | " |
| N-benzoylmethyl-N-ethyl-3-methoxyaniline | reddish-tinged blue |
| N-4-chlorobenzoylmethyl-N-ethyl-3-methoxyaniline | " |
| N-4-chlorobenzoylmethyl-N-methylaniline | blue |
| N-4-chlorobenzoylmethyl-N-butylaniline | " |
| N-4-methylbenzoylmethyl-butylaniline | " |
| N-4-methylbenzoylmethyl-methylaniline | " |
| N-4-methylbenzoylmethyl-ethyl-3-methoxyaniline | reddish-tinged blue |
| N-4-methylbenzoylmethyl-ethyl-3-chloroaniline | blue |
| N-2,5-dimethylbenzoylmethyl-N-ethyl-3-chloroaniline | " |
| N-2,5-dimethylbenzoylmethyl-N-ethyl-3-methoxyaniline | reddish-tinged blue |
| N-2,5-dimethylbenzoylmethyl-N-butylaniline | blue |
| N-2,5-dimethylbenzoylmethyl-N-methylaniline | " |
| N-2,5-propyl-N-benzoylmethyl-3-methoxyaniline | reddish-tinged blue |
| N-2,5-propyl-N-benzoylmethyl-3-chloroaniline | blue |
| N-2,5-propyl-N-benzoylmethyl-3-methylaniline | " |
| N-β-chloroethyl-N-benzoylmethyl-3-methoxyaniline | reddish-tinged blue |
| N-β-chloroethyl-N-benzoylmethyl-3-chloroaniline | blue |
| N-β-chloroethyl-N-benzoylmethyl-3-methylaniline | " |
| N-β-carbonamidoethyl-N-benzoylmethyl-3-chloroaniline | " |
| N-β-carbonamidoethyl-N-benzoylmethyl-3-methoxyaniline | reddish-tinged blue |
| N-β-carbonamidoethyl-N-benzoylmethyl-3-methylaniline | blue |
| N-β-acetoxyethyl-N-benzoylmethyl-3-chloroaniline | " |
| N-β-acetoxyethyl-N-benzoylmethyl-3-methoxyaniline | reddish-tinged blue |
| N-β-acetoxyethyl-N-benzoylmethyl-3-methylaniline | blue |
| N-β-methoxyethyl-N-benzoylmethyl-3-methoxyaniline | reddish-tinged blue |
| N-β-cyanoethyl-N-benzoylmethyl-3-methoxyaniline | " |
| N-cyclohexyl-N-benzoylmethyl-3-methoxyaniline | " |
| N-cyclohexyl-N-benzoylmethyl-3-chloroaniline | blue |
| N-cyclohexyl-N-benzoylmethyl-3-methylaniline | " |

If, in Example 1, instead of using 6-methoxy-2-aminobenzthiazole, the equivalent amount of 2-aminobenzthiazole, 6-ethoxy-2-aminobenzthiazole, 6-benzoylamino-2-aminobenzthiazole, 6-acetylamino-2-aminobenzthiazole, 6-(α-ethyl-capronylamono)-2-aminobenzthiazole, 6-methoxy-4-methyl-2-aminobenzthiazole, 5,6-dimethoxy-2-aminobenzthiazole, a mixture of 5-methyl-6-methoxy- and 7-methyl-6-methoxy-2-aminobenzthiazole, 6-propoxy-2-aminobenzthiazole, 6-butoxy-2-aminobenzthiazole, 6-benzyloxy-2-aminobenzthiazole, 6-tert.-butyl-2-aminobenzthiazole, 6-methyl-2-aminobenzthiazole, 6-benzyl-2-aminobenzthiazole, 4,6,7-trimethyl-2-aminobenzthiazole or 6-ethyl-2-aminobenzthiazole is employed for the diazotisation and is coupled, in the manner described, with N-ethyl-N-β-phenoxycarbonyloxy-ethylaniline hydrochloride, valuable blue dyestuffs are again obtained after analogous working up and, optionally, conversion of the acid salt of the azo dyestuff to the neutral dyestuff and subsequent methylation in the manner described.

If, using this method, the 2-aminobenzthiazoles and coupling components shown below are used, dyestuffs which dye Dralon in the colour shade also shown are obtained.

| 2-Aminobenzthiazole | Coupling component | Colour shade on PAN |
|---|---|---|
| 6-ethoxy- | N-β-phenoxy-carbonyloxyethyl-N-ethylaniline | blue |
| " | N-β-(p-chlorophenoxy-carbonyloxy)-ethyl-N-ethylaniline | " |
| " | N-β-(p-methylphenoxy-carbonyloxy)-ethyl-N-ethylaniline | " |
| " | N-ethyl-N-benzoylmethylaniline | " |
| " | N-β-phenoxy-carbonyloxyethyl-N-ethyl-m-toluidine | " |
| 6-methyl- | N-β-phenoxy-carbonyloxyethyl-N-ethylaniline | " |
| " | N-ethyl-N-benzoylmethylaniline | " |

In addition to the examples listed above, further valuable blue dyestuffs are obtained when, in the preparation of the dyestuffs produced from 2-amino-6-methoxybenzthiazole and tabulated on pages 32 to 49, the following are used instead of 2-amino-6-methoxybenzthiazole: 2-amino-6-ethoxybenzthiazole, 2-amino-6-methoxy-4-methyl-benzthiazole, 2-amino-5,6-dimethoxybenzthiazole, 2-amino-6-benzoylamino-benzthiazole, 2-amino-6-acetylamino-benzthiazole, 2-amino-6-(α-ethyl-capronylamino)-benzthiazole, 2-amino-6-propoxy-benzthiazole, 2-amino-6-butoxybenzthiazole, 2-amino-6-benzyloxy-benzthiazole, 2-amino-6-tert.-butyl-benzthiazole, 2-amino-6-methyl-benzthiazole, 2-amino-6-benzyl-benzthiazole, 2-amino-4,6,7-trimethyl-benzthiazole, 2-amino-6-ethyl-benzthiazole, 2-aminobenzthiazole or a mixture of 5-methyl-6-methoxy-2-aminobenzthiazole and 7-methyl-6-methoxy-2-aminobenzthiazole.

EXAMPLE 2

If the procedure in Example 1 is followed and instead of dimethyl sulphate the equivalent amount of diethyl sulphate is employed, in which case it is advisable to extend the duration of the alkylation to 12 hours, the dyestuff of the formula

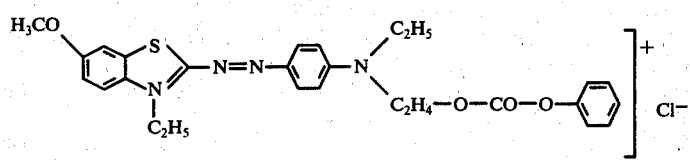

is obtained. It dyes polyacrylonitrile in a blue colour colour shade having good fastness properties.

Comparably good results are obtained if, in preparing the dystuffs mentioned in the tables accompanying Example 1, diethyl sulphate is used instead of dimethyl sulphate.

EXAMPLE 3

10 g of the azo dyestuff described in Example 1, which has not been reacted with dimethyl sulphate, are stirred with 30 g of acetonitrile and 30 ml of n-butyl bromide, 1 g of magnesium oxide is added and the mixture is heated to 80°-85° C for 20 hours. The solvents are then distilled off in a waterpump vacuum. The distillation residue is dissolved in hot water and the solution is clarified with 3 g of active charcoal. The dyestuff is then precipitated with sodium chloride, separated from the solution and dried in vacuo.

The reaction product has the formula

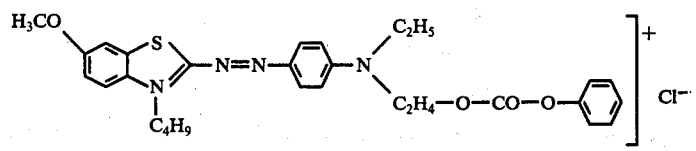

It dyes Dralon in a blue colour shade.

EXAMPLE 4

10 g of the azo dyestuff described in Example 1, which has not been reacted with dimethyl ulphate are stirred into 30 ml of glacial acetic acid at 50° C. Ethylene oxide is then passed in and the temperature is slowly raised to 70° C. As soon as the quaternisation, which can easily be followed in a thin layer chromatogram, has ended, the solution is stirred into 450 ml of 20% strength sodium chloride solution, the mixture is stirred for some minutes longer and the dyestuff is then separated from the solution. It is dried in vacuo and is obtained in quantitative yield.

The product has the formula:

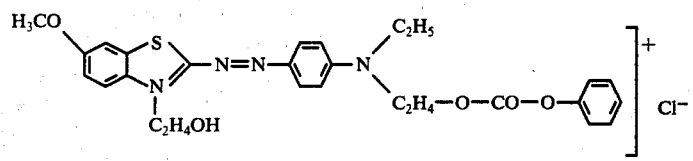

It dyes polyacrylonitrile in a blue colour shade.

EXAMPLE 5

If the procedure indicated in Example 4 is followed and instead of ethylene oxide 10 g of 1,2-butylene oxide are added, analogous working up gives the dyestuff of the formula

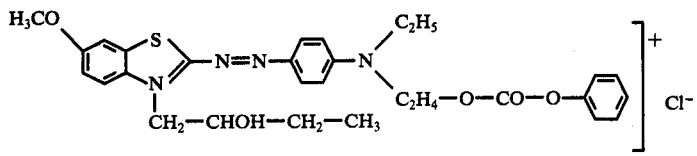

which also dyes Dralon in a blue shade with good fastness properties.

If, following an analogous procedure, the azo dyestuffs from the following 2-aminobenzthiazoles and coupling components are reacted with the epoxides indicated, dyestuffs are obtained, the colour shade of which on Dralon is also listed.

| 2-Aminobenzthiazole | Coupling component | quaternised with | Colour shade on PAN |
|---|---|---|---|
| 6-methoxy- | N-ethyl-N-β-phenoxycarbonyloxy-ethylaniline | propylene oxide | blue |
| " | " | γ-allyloxy-propylene oxide | blue |
| 6-ethoxy- | " | propylene oxide | " |
| " | N-ethyl-N-benzoylmethylaniline | " | " |
| 6-methoxy- | " | " | " |
| " | " | ethylene oxide | " |
| 6-methyl- | " | " | " |
| " | " | propylene oxide | " |
| " | N-ethyl-N-phenoxycarbonyloxy-ethylaniline | " | " |

In addition to the example listed above, further blue dyestuffs are obtained when, preparing the dyestuffs mentioned in Example 1 and the tables accompanying Example 1, quaternisation is not carried out with dimethyl sulphate as described there, and instead the quaternisation is carried out, as prescribed in Examples 4 and 5, with ethylene oxide, propylene oxide, butylene oxide, γ-phenoxypropylene oxide, γ-allyloxypropylene oxide, styrene oxide, γ-methoxypropylene oxide, γ-ethoxypropylene oxide, γ-propoxypropylene oxide, epichlorohydrin or other epoxides.

EXAMPLE 6

25.2 g of the non-quaternised azo dyestuff mentioned in Example 1 are stirred with 35.5 g of acrylic acid amide in 115 g of glacial acetic acid, 5 g of 36% strength hydrochloric acid are added and the solution is heated to 90° C until non-quaternised azo dyestuff is no longer detectable in a thin layer chromatogram. The resulting mixture is stirred into 500 parts of 20% strength sodium chloride solution and the dyestuff is separated from the aqueous phase. The dyestuff has the formula

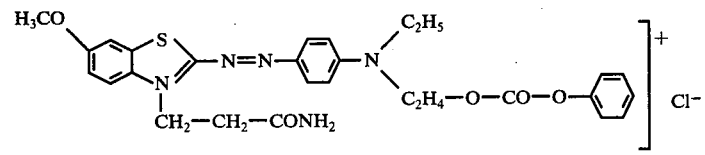

and dyes Dralon in a blue colour shade.

Blue dyestuffs are also obtained when, in the preparation of the dyestuffs listed in the tables accompanying Example 1, quaternisation is not carried out with dimethyl sulphate as indicated there, but with acrylic acid amide as described in Example 6.

EXAMPLE 7

A polyacrylonitrile woven fabric is printed with a printing paste which was prepared as follows: 30 parts by weight of hot water are poured over 30 parts by weight of the dyestuff described in Example 1, 50 parts by weight of thiodiethylene glycol, 30 parts by weight of cyclohexanol and 30 parts by weight of 30% strength acetic acid and the resulting solution is added to 500 parts by weight of crystal gum (gum arabic as a thickener). Finally, 30 parts by weight of zinc nitrate solution are also added. The resulting print is dried, steamed for 30 minutes and then rinsed. A blue print of very good fastness properties is obtained.

EXAMPLE 8

Acid-modified polyethylene glycol terephthalate fibres are introduced, using a liquor ratio of 1:40, into an aqueous bath at 20° C, which contains, per liter, 3 to 10 g of sodium sulphate, 0.1 to 1 g of oleyl polyglycol ether (50 mols of ethylene oxide), 0–15 g of dimethylbenzyl-dodecylammonium chloride and 0.15 g of the dyestuff described in Example 1 and which has been adjusted to pH 4–5 with acetic acid. The bath is heated to 100° C over the course of 30 minutes and is kept at this temperature for 60 minutes. The fibres are then rinsed and dried.

A blue dyeing with very good fastness properties is obtained.

Comparably good results are obtained with the dyestuffs mentioned in the tables accompanying Example 1, and Examples 2 to 6.

EXAMPLE 9

Polyacrylonitrile fibres are introduced, using a liquor ratio of 1:40 into an aqueous bath at 40° C which contains, per liter, 0.75 g of 30% strength acetic acid, 0.38 g of sodium acetate and 0.15 g of the dyestuff described in Example 1. The bath is heated to the boil over the course of 20–30 minutes and is kept at this temperature for 30–60 minutes. After rinsing and drying, a blue dyeing having very good fastness properties is obtained.

EXAMPLE 10

A stock solution is prepared from 15 parts by weight of the dyestuff mentioned in Example 1, 15 parts by weight of polyacrylonitrile and 70 parts by weight of dimethylformamide and is added to a customary spinning solution of polyacrylonitrile, which is spun in a known manner.

A blue dyeing having very good fastness properties is obtained.

EXAMPLE 11

Acid-modified synthetic polyamide fibres are introduced, using a liquor ratio of 1:40, into an aqueous bath at 40° C which contains, per liter, 10 g of sodium acetate, 1 to 5 g of oleyl polyglycol ether (50 mols of ethylene oxide) and 0.3 g of the dyestuff described in Example 1 and which has been adusted to pH 4–5 with acetic acid. The bath is heated to 98° C over the course of 30 minutes and is kept at this temperature. The fibres are then rinsed and dried. A blue dyeing is obtained.

I claim:

1. Dyestuff of the formula

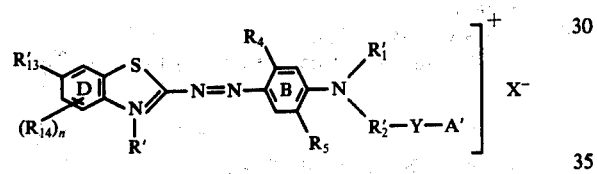

wherein

R' represents $C_1$-$C_6$-alkyl; $C_2$-$C_7$-alkenyl; benzyl; phenethyl; benzyl or phenylethyl substituted by halogen, hydroxyl, cyano, $C_1$-$C_3$-alkylcarbonyloxy, $C_1$-$C_4$-alkoxycarbonyl, hydroxycarbonyl or aminocarbonyl; or

$R_{17}$ denotes hydrogen or methyl;
$R_{18}$ denotes methyl, ethyl, chloromethyl, $C_1$-$C_4$-alkoxymethyl, allyloxymethyl, phenoxymethyl or phenyl;
$R'_1$ represents $C_1$-$C_6$-alkyl; $C_1$-$C_6$-alkyl substituted by halogen, hydroxyl, $C_1$-$C_4$-alkoxy, cyano, $C_1$-$C_3$-alkylcarbonyloxy, hydroxycarbonyl, $C_1$-$C_4$-alkoxycarbonyl, $C_1$-$C_4$-alkoxycarbonyloxy, aminocarbonyl, $C_1$-$C_4$-alkylsulphonylamino or $C_1$-$C_4$-alkylsulphonyl-$C_1C_4$-alkylamino; $C_2$-$C_7$-alkenyl; cyclopentyl; cyclohexyl; benzyl; β-phenylethyl; or cyclopentyl, cyclohexyl, benzyl or β-phenylethyl substituted by $C_1$-$C_6$-alkyl;
$R'_2$ represents

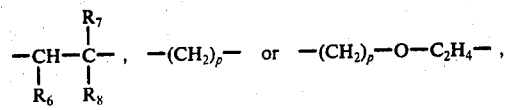

$R_6$ denotes hydrogen, methyl, ethyl, $C_1$-$C_4$-alkoxymethyl, allyloxymethyl, phenyl or phenoxymethyl;
$R_7$ denotes hydrogen, methyl, ethyl, $C_1$-$C_4$-alkoxymethyl, allyloxymethyl, phenyl, phenoxymethyl or -Y-A';
$R_8$ denotes hydrogen or methyl;
p denotes the numbers from 1 to 6;
$R_4$ represents hydrogen; halogen; $C_1$-$C_6$-alkyl; $C_1$-$C_6$-alkyl substituted by halogen, $C_1$-$C_4$-alkoxy, benzyloxy, β-phenylethyloxy, or benzyloxy or β-phenylethyloxy which are substituted by $C_1$-$C_6$-alkyl in the phenyl ring; cyano; phenoxy; naphthyloxy; phenoxy or naphthyloxy substituted by $C_1$-$C_6$-alkyl or halogen; $C_1$-$C_4$-alkylcarbonylamino; $C_1$-$C_4$-alkylsulphonylamino; phenylcarbonylamino; phenylsulphonylamino; $C_1$-$C_4$-alkylcarbonyloxy or phenylcarbonyloxy; or, together with B, a naphthalene or tetrahydronaphthalene ring;
$R_5$ represents hydrogen; $C_1$-$C_6$-alkyl; $C_1$-$C_4$-alkoxy; benzyloxy; β-phenylethyloxy; benzyloxy or β-phenylethyloxy substituted by $C_1$-$C_6$-alkyl in the phenyl ring; phenoxy; naphthyloxy; phenoxy or naphthyloxy substituted by $C_1$-$C_6$-alkyl or halogen; $C_1$-$C_4$-alkylcarbonylamino; $C_1$-$C_4$-alkyl-sulphonylamino; phenylcarbonylamino; phenyl-sulphonylamino; $C_1$-$C_4$-alkylcarbonyloxy; or phenylcarbonyloxy; or, together with B, a naphthalene or tetrahydronaphthalene ring;
$R'_{13}$ represents hydrogen; $C_1$-$C_6$-alkyl; $C_1$-$C_4$-alkoxy; cyclopentyl; cyclohexyl; benzyl; β-phenylethyl; cyclopentyl, cyclohexyl, benzyl or β-phenylethyl substituted by $C_1$-$C_6$-alkyl; phenoxy; naphthyloxy; phenoxy or naphthyloxy substituted by $C_1$-$C_6$-alkyl or halogen; benzyloxy; $C_1$-$C_4$-alkylcarbonylamino; $C_1$-$C_4$-alkyl-sulphonylamino; phenylcarbonylamino; or phenylsulphonylamino; or a benzene or tetrahydrobenzene fused to the 4,5 or 5,6-position of D;
$R_{14}$ represents $C_1$-$C_6$-alkyl; $C_1$-$C_4$-alkoxy; phenoxy; benzyloxy; benzyl; trifluoromethyl; halogen; $C_1$-$C_4$-alkylcarbonylamino; $C_1$-$C_4$-alkylsulphonylamino, phenylcarbonylamino; or phenylsulphonylamino; or when n is 1, represents a benzene or tetrahydrobenzene ring fused to the 6,7-position of D;
n represents the numbers, 0, 1, 2 or 3;
A' represents a benzene, naphthalene or tetrahydronaphthalene ring; or a benzene, naphthalene ring substituted by $C_1$-$C_4$-alkyl, $C_1$-$C_4$-alkoxy, halogen, phenyl, cyclohexyl, $C_1$-$C_4$-alkoxycarbonyl, benzyl, $C_1$-$C_4$-alkylsulphonyl or phenylsulphonyl, in which the cyclic substituents are unsubstituted or substituted by halogen, $C_1$-$C_4$-alkyl or $C_1$-$C_4$-alkoxy;
X represents an anion; and
Y represents -CO- or -O-CO-O.

2. Dyestuff of claim 1 wherein
Y represents -OCOO;
$R'_2$ represents

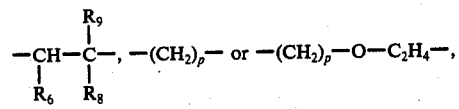

and
$R_9$ represents hydrogen, methyl, ethyl, methoxymethyl, ethoxymethyl, propoxymethyl, butoxymethyl, allyloxymethyl, phenyl, phenoxymethyl or -O-CO-O-A'.

3. Dyestuff according to claim 2, in which
R'$_{13}$ represents an alkoxy group with 1-4 C atoms and
R$_{14}$ represents methyl, ethyl, methoxy, ethoxy, chlorine, bromine, fluorine, trifluoromethyl, phenoxy or benzyloxy.

4. Dyestuff according to claim 2, in which
R'$_{13}$ represents a methoxy or ethoxy group,
R' represents methyl or ethyl,
R$_5$ represents hydrogen,
R$_4$ represents hydrogen, methoxy, chlorine or methyl and
n represents the number 0.

5. Dyestuff of claim 1 wherein
R'$_2$ is -CH$_2$-; and
Y is -CO-.

6. Dyestuff according to claim 5, in which
R'$_{13}$ represents an alkoxy group with 1-4 C atoms and
R$_{14}$ represents methyl, ethyl, methoxy, ethoxy, chlorine, bromine, fluorine, trifluoromethyl, phenoxy or benzyloxy.

7. Dyestuff according to claim 5, in which
R'$_{13}$ represents methoxy or ethoxy,
R' represents methyl or ethyl,
R$_5$ represents hydrogen,
R$_4$ represents hydrogen, methoxy, chlorine or methyl and
n represents the number 0.

8. Dyestuff according to claim 1, in which
R'$_{13}$ represents methoxy and
R' represents methyl.

9. Dyestuff according to claim 1, in which
R'$_{13}$ represents an alkoxy group with 1-4 C atoms and
R$_{14}$ represents methyl, ethyl, methoxy, ethoxy, chlorine, bromine, fluorine, trifluoromethyl, phenoxy or benzyloxy.

10. Dyestuff according to claim 1, in which
R'$_{13}$ represents a methoxy or ethoxy group,
R' represents methyl or ethyl,
R$_5$ represents hydrogen,
R$_4$ represents hydrogen, methoxy, chlorine or methyl,
p represents the number 2 and
n represents the number 0.

11. Dyestuff according to claim 1 of the formula

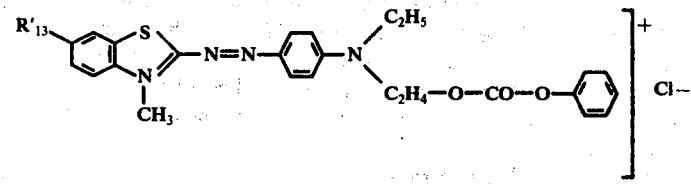

in which
R'$_{13}$ is CH$_3$ or CH$_3$-O.

12. Dyestuff according to claim 1 of the formula

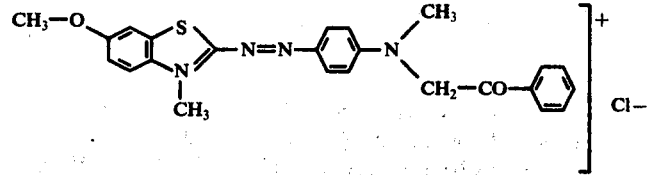

13. Dyestuff according to claim 1 of the formula

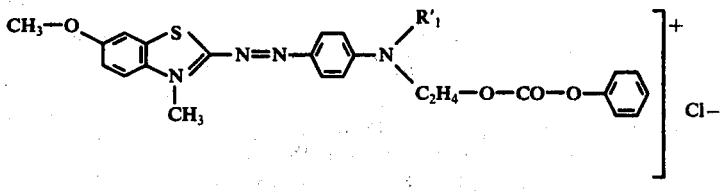

in which
R-$_1$ is C$_2$H$_5$ or C$_4$H$_9$.